(12) United States Patent
Nakahara

(10) Patent No.: US 7,738,028 B2
(45) Date of Patent: Jun. 15, 2010

(54) CAMERA HAVING A FOCUSING ADJUSTING SYSTEM

(75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 466 days.

(21) Appl. No.: 11/847,554

(22) Filed: Aug. 30, 2007

(65) Prior Publication Data

US 2008/0055457 A1 Mar. 6, 2008

(30) Foreign Application Priority Data

Aug. 31, 2006 (JP) ............................. 2006-234932

(51) Int. Cl.
*H04N 5/232* (2006.01)
*G03B 13/00* (2006.01)
*G03B 3/00* (2006.01)
*G03B 13/34* (2006.01)

(52) U.S. Cl. ..................... 348/353; 396/104; 396/121

(58) Field of Classification Search ................. 348/353, 348/352, 356
See application file for complete search history.

(56) References Cited

U.S. PATENT DOCUMENTS

| | | | |
|---|---|---|---|
| 6,975,348 B2 * | 12/2005 | Chiu et al. ................... 348/169 |
| 7,058,294 B2 | 6/2006 | Nakahara |
| 7,428,375 B2 * | 9/2008 | Yost et al. ..................... 396/52 |
| 7,483,071 B2 * | 1/2009 | Koreki ........................ 348/345 |
| 7,590,343 B2 * | 9/2009 | Yata ............................ 396/147 |
| 2007/0140676 A1 * | 6/2007 | Nakahara ..................... 396/103 |
| 2008/0136958 A1 * | 6/2008 | Nakahara ..................... 348/345 |
| 2008/0143866 A1 * | 6/2008 | Nakahara ..................... 348/345 |
| 2008/0316325 A1 * | 12/2008 | Nakahara ................... 348/222.1 |

FOREIGN PATENT DOCUMENTS

| | | |
|---|---|---|
| JP | 6153053 | 5/1994 |
| JP | 200272074 | 3/2002 |
| JP | 2002311325 | 10/2002 |

OTHER PUBLICATIONS

English language Abstract of JP 6-153053.
English language Abstract of JP 2002-72074.
English language Abstract of JP 2002-311325.
U.S. Appl. No. 11/754,506 to Nakahara, which was filed on May 29, 2007.
U.S. Appl. No. 11/757,428 to Nakahara, which was filed on Jun. 4, 2007.

* cited by examiner

*Primary Examiner*—John M Villecco
(74) *Attorney, Agent, or Firm*—Greenblum & Bernstein P.L.C.

(57) ABSTRACT

A camera with a photographing optical system, including a focus adjusting system which captures images at different focal positions via an image pickup device while moving a focusing lens group within a controllable searching range, and moves the focusing lens group to the in-focus position; a memory which stores a first image captured when an in-focus state is achieved; and a comparing device which compares the first image stored in the memory with a second image captured via the image pickup device before commencement of movement of the focusing lens group. The focus adjusting system operates within a limited searching range including a current position of the focusing lens group when predetermined conditions are satisfied, including a condition upon which it is determined that the first image and the second image match each other completely or by a predetermined degree.

18 Claims, 16 Drawing Sheets

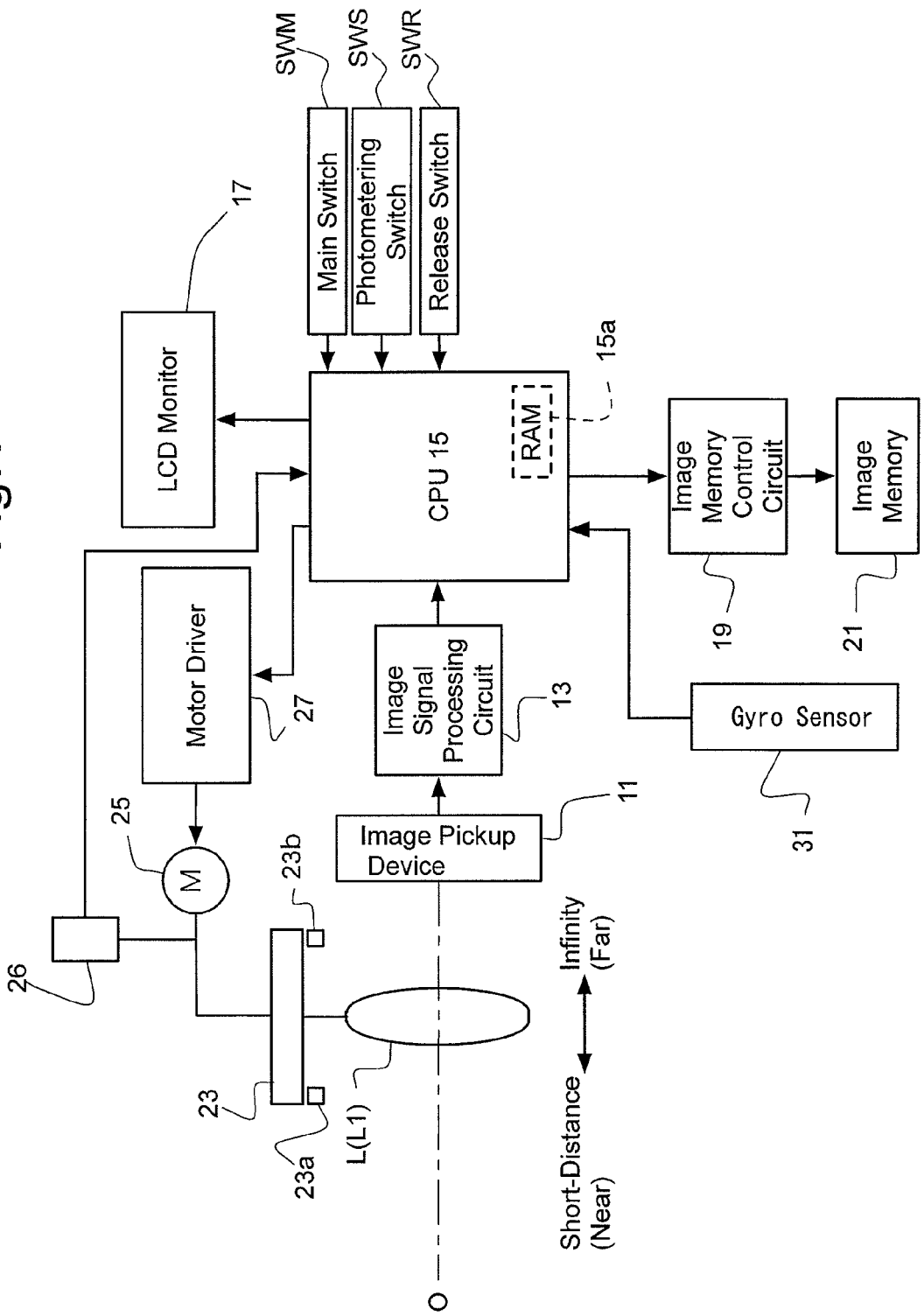

[Multi-point Distance Measuring Mode]

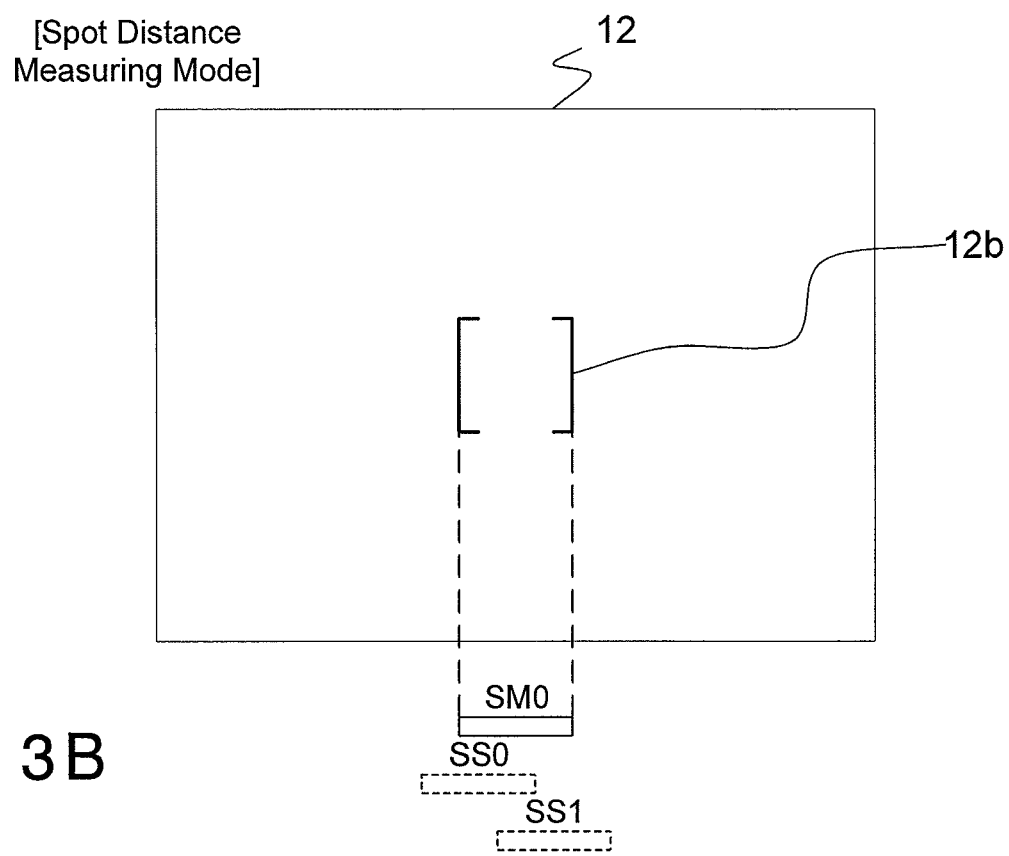

[Multi-Point Distance Measuring Mode]

[Spot Distance Measuring Mode]

Short-Distance → Far-Extremity

Short-Distance → Far-Extremity

PN
PN-n    PN+n (a)

(b)

(c)

(d)

(e)

(a): Object Image Pattern Captured Immediately After Focus is Achieved
(b)~(e): Object Image Pattern Captured When Contrast Af Process is Performed Again

| a-b | = 0

| a-c | = 9

| a-d | = 1 2

| a - e | = 1 8

High

Degree of Image Matching

Low

CAMERA HAVING A FOCUSING ADJUSTING SYSTEM

BACKGROUND OF THE INVENTION

1. Field of the Invention

The present invention relates to a focus adjusting system, and in particular relates to a camera having a contrast-detection type focus adjusting system.

2. Description of the Prior Art

A conventional digital camera with a contrast-detection type focus adjusting system (focusing system) which detects a focus state by performing an AF search operation in which a focusing lens group is moved from one to the other of the infinite focus position (far extremity/position for bringing an object at infinity into focus) and the closest (shortest) focus position (near extremity/position for bringing an object at the shortest distance in working range into focus) is known in the art, wherein the AF search operation is terminated upon a peak contrast occurring during the AF search operation on the supposition that this position of the focusing lens group at which the peak contrast is obtained is an in-focus position. This digital camera is disclosed in Japanese Unexamined Patent Publication 2002-311325. In this digital camera, the aforementioned AF search operation commences upon the release bottom of the camera being depressed in a half way at normal times. Moreover, a digital camera is disclosed in Japanese Unexamined Patent Publication 2002-072074, wherein the AF search operation starts from the infinite focus position when the focusing lens group is positioned closer to the infinite focus position than the closest focus position, and starts from the closest focus position when the focusing lens group is positioned closer to the closest focus position than the infinite focus position, in order to reduce the time for the AF search operation.

Furthermore, among conventional cameras having a shake reduction system (camera-shake reduction system/camera-shake correcting system/image stabilizer), a camera is known in the art in which it is detected which of the following three different states the camera is currently in according to the output of a gyro sensor: a first state in which the camera is being swung for panning, a second state in which the camera is being swung for tilting, and a third state in which the camera is being shaken due to hand shake or the like, and in which an autofocusing operation is performed when it is detected that the camera is currently in the aforementioned first or second state. This camera is disclosed in Japanese Unexamined Patent Publication H06-153053.

However, in conventional digital cameras, even if the release button is again depressed half way with a main object substantially remaining unchanged after focus is achieved (an in-focus state is obtained) on the main object by the AF search operation, the AF search operation in which the focusing lens group is moved from the infinite focus position or the closest focus position is performed again, and accordingly, it sometimes takes time for the AF search operation to be performed when it is performed for a searching range in which no main object exists.

SUMMARY OF THE INVENTION

The present invention provides a camera having a contrast-detection type focus adjusting system which can reduce the time required for the AF search operation by performing the AF search operation in which the focusing lens group is moved not all the way from one to the other of the near extremity and the far extremity in the case where an autofocusing operation is performed again after an in-focus state is achieved.

According to an aspect of the present invention, a camera with a photographing optical system is provided, including a focusing lens group movable for focusing, the camera including a focus adjusting system which captures images at different focal positions of the focusing lens group via an image pickup device while moving the focusing lens group within a controllable searching range to detect an in-focus position of the focusing lens group based on contrasts of the captured images, and moves the focusing lens group to the in-focus position; a memory which stores a first image captured via the image pickup device when an in-focus state is achieved upon the focusing lens group being moved to the in-focus position; and a comparing device which compares the first image that is stored in the memory with a second image which is captured via the image pickup device before commencement of movement of the focusing lens group when the focus adjusting system is subsequently actuated. The focus adjusting system operates with the controllable searching range narrowed to a limited searching range including a current position of the focusing lens group when predetermined conditions are satisfied, the predetermined conditions including a condition upon which it is determined that the first image and the second image match each other one of completely and by a predetermined degree.

It is desirable for the limited searching range to be one of equal to and wider than a minimum range in which the current position of the focusing lens group can be determined to be an in-focus position thereof based on the contrasts of the images that the focus adjusting systems captures while moving the focusing lens group within the limited searching range.

It is desirable for the images captured by the focus adjusting system to be used to detect the in-focus position of the focusing lens group are those included in at least one predetermined focus detection area.

It is desirable for the focus adjusting system to move the focusing lens group stepwise from a near extremity side toward a far extremity when moving the focusing lens group in the limited searching range.

It is desirable for the predetermined conditions to include a condition upon which a lapse of time since a moment an in-focus state is last achieved is smaller than a predetermined period of time.

It is desirable for the image pickup device to operate in different operational modes when an object brightness is one of equal to and greater than a predetermined brightness value and when the object brightness is smaller than the predetermined value, respectively. The predetermined conditions include a condition upon which the image pickup device operates in a same operational mode in both a latest image capturing operation and a second latest image capturing operation that is performed upon an in-focus state being last achieved.

It is desirable for the predetermined conditions to include a condition upon which a difference between a latest object brightness and a second latest object brightness that is obtained upon an in-focus state being last achieved is one of equal to or smaller than a predetermined value.

It is desirable for the predetermined conditions include a condition upon which a position of the focusing lens group at which the focusing lens group is stopped when an in-focus state is last achieved is within a predetermined range in an entire range of movement of the focusing lens group that corresponds to a maximum of the controllable searching range.

It is desirable for the predetermined range to correspond to approximately one third of the entire range of movement of the focusing lens group in a center portion of the entire range of movement thereof.

It is desirable for the predetermined conditions to include a condition upon which a currently-selected exposure mode is an exposure mode other than a macro mode.

It is desirable for the camera to include a vibration sensor for detecting vibrations caused by hand shake, tilting and panning movements of a camera body, and for the predetermined conditions to include a condition upon which the vibration sensor does not detect any of the hand shake, the tilting and panning movements.

It is desirable for the focus adjusting system to narrow the controllable searching range by a larger amount as the degree of image matching increases.

It is desirable for each of the first image and the second image, which are compared with each other by the comparing device, to be an object image pattern produced by binarizing an image of the object within a focus detection area in units of pixels.

It is desirable for the focus adjusting system to repeat a process of capturing the images at the different positions via the image pickup device while moving the focusing lens group stepwise to obtain the contrasts of the captured images, determine a position of the focusing lens group at which a peak contrast is obtained to be an in-focus position of the focusing lens group if the peak contrast exists among a group of contrasts at immediately preceding consecutive lens positions of the focusing lens group, and move the focusing lens group to the in-focus position.

It is desirable for the different positions to be included in the controllable searching range.

It is desirable for the focus adjusting system to include a stepping motor which moves the focusing lens group stepwise.

While moving the focusing lens group stepwise by the stepping motor, it is desirable for the focus adjusting system to capture an image of the object each time the focusing lens group is moved by one step, and detect a peak contrast among a plurality of contrasts of the captured object images to determine the in-focus position.

When the focus state is an out-of-focus state as a result of performing the limited searching range operation, it is desirable for the focus adjusting system performs a normal contrast AF process.

According to the present invention, since the controllable searching range is narrowed to a limited searching range including an in-focus position of the focusing lens group under predetermined conditions when the AF search operation is performed again after an in-focus state is achieved, the AF search operation is not performed for a searching range in which no main object exists, which makes it possible to reduce the time for refocusing.

The present disclosure relates to subject matter contained in Japanese Patent Application No. 2006-234932 (filed on Aug. 31, 2006) which is expressly incorporated herein in its entirety.

BRIEF DESCRIPTION OF THE DRAWINGS

The present invention will be discussed below in detail with reference to the accompanying drawings, in which:

FIG. 1 is a block diagram of elements of an embodiment of a digital camera to which a focus adjusting system according to the present invention is applied, showing a basic configuration of the digital camera;

FIGS. 2A and 2B are diagrammatic sketches showing the relationship between the light receiving surface of an image pickup device and a plurality of focus detection areas on the light receiving surface in the digital camera in a multi-point distance measuring mode, wherein FIG. 2A shows a focus frame in which the plurality of detection areas are distributed, and FIG. 2B shows the relationship between the plurality of focus detection areas and an associated plurality of support areas;

FIGS. 3A and 3B are diagrammatic sketches showing the relationship between the light receiving surface of the image pickup device and a single focus detection area on the light receiving surface in the digital camera in a spot distance measuring mode, wherein FIG. 3A shows a focus frame in which the single focus detection area is positioned, and FIG. 3B shows the relationship between the single focus detection area and associated support areas;

FIGS. 4A, 4B, 4C and 4D are graphs showing movements of the focusing lens group, wherein FIG. 4A shows an example when the focusing lens group is positioned in the vicinity of the infinite focus position in the multi-point distance measuring mode, FIG. 4B shows an example when the focusing lens group is positioned in the vicinity of the closest focus position in the multi-point distance measuring mode, FIG. 4C shows an example when the focusing lens group is positioned in the vicinity of the infinite focus position in the spot distance measuring mode, and FIG. 4D shows an example when the focusing lens group is positioned in the vicinity of the closest focus position in the spot distance measuring mode;

FIGS. 5A and 5B are graphs showing movements of the focusing lens group in a contrast AF process according to the present invention, wherein FIG. 5A shows an example when the contrast AF process is performed for the first time, and FIG. 5B shows an example when the contrast AF process is performed again after an in-focus state is obtained;

FIGS. 7A through 7E each show an example of binarized image data (brightness data) in a focus detection area used for focusing, wherein FIG. 7A shows an example of an object image pattern based on image data obtained immediately after an in-focus state is obtained and FIGS. 7B through 7E each show an example of the object image pattern based on image data obtained upon an AF search operation in the contrast AF process being performed again;

DESCRIPTION OF THE PREFERRED EMBODIMENT

Figures 2A, 2B:
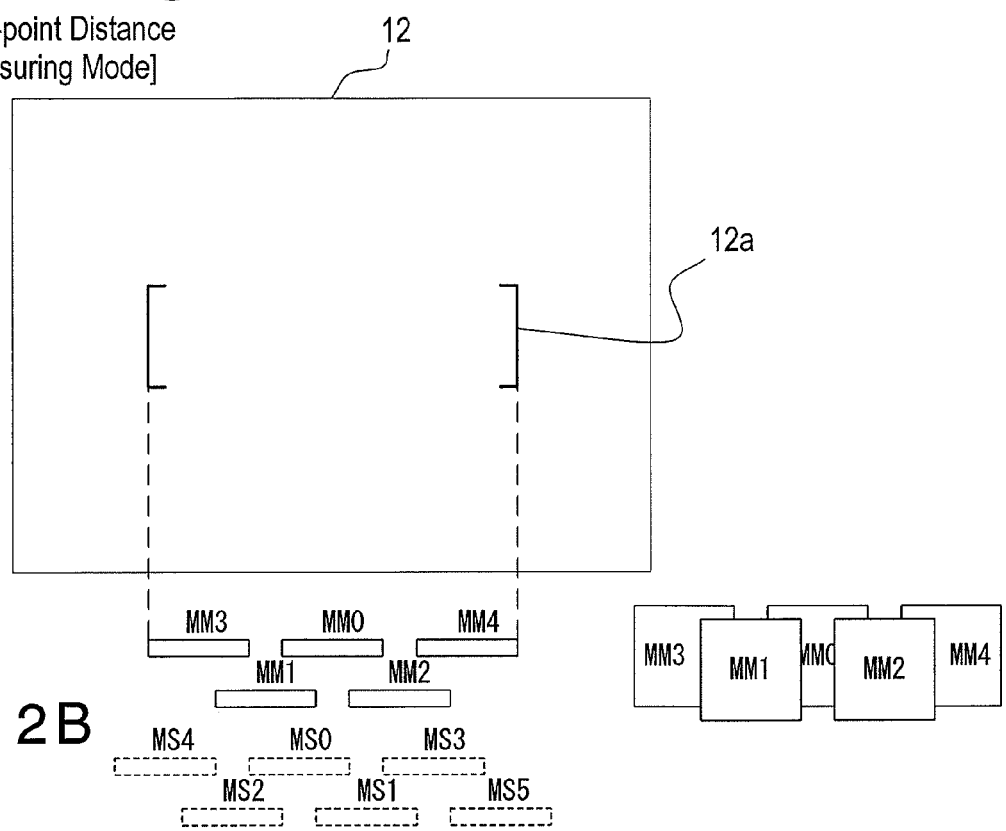

FIG. 1 is a block diagram of elements of an embodiment of a digital camera having a contrast AF type of focus adjusting system (focusing system) to which the present invention is applied.

This digital camera is provided with a photographing lens (photographing optical system) L including a focusing lens group L1, and an image pickup device (CCD image sensor) 11 serving as an imaging device. An object image is formed on a light receiving surface 12 (see FIGS. 2 and 3) of the image pickup device 11 via the photographing lens L. The image pickup device 11 includes a large number of pixels (photoelectric transducing elements) arranged in a two-dimensional matrix at predetermined intervals. The digital camera is further provided with an image signal processing circuit 13, a CPU (comparing device) 15, an LCD monitor 17, an image memory control circuit 19, and an image memory 21. Each pixel of the image pickup device 11 converts the incident light of an object image thereon into an electrical charge, and the electrical charges are accumulated (integrated). Upon completion of an exposure, the accumulated charges are output, pixel by pixel, as an image signal to the image signal processing circuit 13. The image signal processing circuit 13 performs predetermined adjusting processes such as a white-balance adjusting process and an A/D converting process on the input image signal to output digital image data to the CPU 15. Namely, image data to which a predetermined process has been given and converted into digital image data in units of pixels are output to the CPU 15. The CPU 15 converts the input image data into an image signal capable of being indicated on the LCD monitor 17 to visually indicate the image data on the LCD monitor 17 in a through mode (monitoring mode). When the contrast AF process is performed, the CPU 15 captures the image data within the selected detection area or areas and temporarily stores the image data thus captured in an internal RAM (image cache memory) 15a to process the image data when the contrast AF process is performed. In an image recording mode, the CPU 15 converts the input image data into image data having a predetermined format to write this image data into the image memory 21 via the image memory control circuit 19.

The digital camera is further provided with a gyro sensor 31 serving as a vibration sensor which can detect vibrations caused by hand shake, tilting and panning movements of the camera body. The gyro sensor 31 can detect vibrations of a photographing optical axis O of the photographing lens L in the vertical and lateral (horizontal) directions in a state where the camera body is held in the proper position. The CPU 15 can detect whether or not the camera body is vibrating due to hand shake in accordance with the output of the gyro sensor 31. Additionally, the CPU 15 can detect whether the camera body is being tilted or panned in accordance with the output of the gyro sensor 31. It should be noted that, in the case where the digital camera incorporates a shake reduction system, a shake/vibration sensor serving as an element of this shake reduction system can be used as the gyro sensor 31.

FIGS. 2A and 2B show the relationship between five focus detection areas MM0, MM1, MM2, MM3 and MM4 and six support areas MS0, MS1, MS2, MS3, MS4 and MS5 which support these five focus detection areas, as an example of the light receiving surface (imaging surface) 12 of the image pickup device 11 provided with a plurality of focus detection areas for multi-point distance measurement. FIG. 2A shows a focus frame (AF frame) 12a which includes the five focus detection areas MM0, MM1, MM2, MM3 and MM4 and the six support areas MS0, MS1, MS2, MS3, MS4 and MS5, and FIG. 2B schematically shows a state of overlapping among the five focus detection areas MM0, MM1, MM2, MM3 and MM4 and the six support areas MS0, MS1, MS2, MS3, MS4 and MS5.

In the present embodiment of the digital camera, the focus detection area MM1 overlaps each of the two focus detection areas MM0 and MM3 adjacent to the focus detection area MM1, and the focus detection area MM2 overlaps each of the two focus detection areas MM0 and MM4 adjacent to the focus detection area MM2. Additionally, the two support areas MS0 and MS1 overlap the focus detection area MM0 from the laterally opposite sides thereof, respectively, while overlapping each other; the two support areas MS0 and MS2 overlap the focus detection area MM1 from the laterally opposite sides thereof, respectively, while overlapping each other; the two support areas MS1 and MS3 overlap the focus detection area MM2 from the laterally opposite sides thereof, respectively, while overlapping each other; the two support areas MS2 and MS4 overlap the focus detection area MM3 from the laterally opposite sides thereof, respectively, while overlapping each other; and the two support areas MS3 and MS5 overlap the focus detection area MM4 from the laterally opposite sides thereof, respectively, while overlapping each other.

The overlapping and supplemental relationship between the five focus detection areas MM0, MM1, MM2, MM3 and MM4 and the six support areas MS0, MS1, MS2, MS3, MS4 and MS5 is as follows.

The focus detection area MM0 is supported by the two support areas MS0 and MS1, the focus detection area MM1 is supported by the two support areas MS0 and MS2, the focus detection area MM2 is supported by the two support areas MS1 and MS3, the focus detection area MM3 is supported by the two support areas MS2 and MS4, and the focus detection area MM4 is supported by the two support areas MS3 and MS5.

The focus detection area MM0 and the two support areas MS0 and MS1 are used as a group of focus detection areas for detecting a focus state, the focus detection area MM1 and the two support areas MS0 and MS2 are used as a group of focus detection areas for detecting a focus state, the focus detection area MM2 and the two support areas MS1 and MS3 are used as a group of focus detection areas for detecting a focus state, the focus detection area MM3 and the two support areas MS2 and MS4 are used as a group of focus detection areas for detecting a focus state, and the focus detection area MM4 and the two support areas MS3 and MS5 are used as a group of focus detection areas for detecting a focus state.

FIGS. 3A and 3B show the relationship between a focus detection area SM0 and two support areas SS0 and SS1 which support the focus detection area SM0, as an example of the light receiving surface (imaging surface) 12 of the image pickup device 11 provided with a single focus detection area for spot distance measurement. FIG. 3A shows a focus frame (AF frame) 12*b* which includes the focus detection area SM0 and the two support areas SS0 and SS1, and FIG. 3B schematically shows a state of overlapping among the focus detection area SM0 and the two support areas SS0 and SS1.

In the present embodiment of the digital camera, each support area (MS0 through MS5 and SS0 and SS1) is used to improve the accuracy of the associated overlapping focus detection area (MM0 through MM4 and SM0), i.e., to improve the accuracy in detection of contrast of the object image included in each focus detection area and the associated one support area (that include the overlapping portion therebetween), and is not used to make a selection of focus detection areas MS0 through MS4. In addition, in the present embodiment of the digital camera, the focus frame 12*b* used for the spot distance measurement is narrower than the focus frame 12*a* used in the multi-point distance measurement.

Although not shown in detail in the drawings, primary-color filters (red (R), green (G) and blue (B) filters) are disposed in front of each pixel (photoelectric transducing element) on the object side thereof, and each pixel on the light receiving surface 12 transduces the red, green and blue components of the incident rays of object light that are passed through the primary-color filters into electrical charges, and these electrical charges are accumulated. The electrical charges thus accumulated for a predetermined period of time are read out of the image pickup device 11 pixel by pixel to be output as an image signal. Note that a typical arrangement (Bayer array) is adopted as the arrangement of the primary-color filters, and four pixels (a 2 by 2 matrix of pixels) in each square are treated as one pixel block.

The read-out image signal is processed according to a known algorithm. For instance, in the contrast AF process, an operation for determining the difference between the intensity of a pixel block (the sum of brightness of four pixels) and the intensity of another pixel block positioned one pixel-block away from the previous pixel block is repeated, and the differences thus determined are summed up to be regarded as the contrast value on the focus detection area at the current position of the focusing lens group L1.

In the contrast AF mode in the present embodiment of the digital camera, a combination of a CCD high-speed drive mode and a small pixel-count addition mode, and a combination of a CCD low-speed drive mode and a large pixel-count addition mode (VGA) are switched according to the brightness of an object to be photographed. When the brightness of the object is high, the above described control of the image pickup device 11 is carried out in the small pixel-count addition mode in the case where the image pickup device 11 operates in the CCD high-speed drive mode (in which the exposure time of the image pickup device 11 is short).

In the case of a low-brightness object, the image pickup device 11 operates in the CCD low-speed drive mode (in which the exposure time of the image pickup device is long) and in the large pixel-count addition mode, in which, e.g., the intensities of four pixel blocks (sixteen pixels in total) adjacent to one another are added up or the intensities of four-by-four pixels (sixteen pixels in total) centered on each pixel block are added up.

In the present embodiment of the digital camera, the CPU 15 performs an image capturing process on the image pickup device 11 while moving the focusing lens group L1 stepwise via the motor driver 27, the AF motor 25 and the lens drive mechanism 23; inputs the image signals from the preselected detection areas MM0 through MM4 among the image signals of the captured image to determine the contrast values on the preselected detection areas MM0 through MM4, respectively; and stores the determined contrast values in the internal RAM 15*a* of the CPU 15 as contrast data. The CPU 15 performs an AF operation (including an AF search operation (scanning operation)) in which the CPU 15 repeats the above described process while moving the focusing lens group L1 stepwise in the direction from the closest focus position (one end of the range of movement of the focusing lens group L1) to the infinite focus position (the other end of the range of movement of the focusing lens group L1), or vice versa.

FIGS. 4A through 4D are graphs each showing the relationship between different positions of the focusing lens group L1 and the respective contrast values thereat, and movements of the focusing lens group L1.

In the present embodiment of the digital camera, the position (lens position) of the focusing lens group L1 in the optical axis direction is detected using an origin sensor 23*a* and an origin sensor 23*b* with the closest focus position (near extremity) and the infinite focus position (far extremity) of the focusing lens group L1 being predetermined as two points of origin, respectively, and is counted as the number of drive pulses from either point of origin. The drive pulses are defined as, e.g., pulses output from an encoder 26 such as a photo-interrupter installed on the output shaft of the AF motor 25. Although several hundreds of pulses or more are usually necessary for driving the focusing lens group L1 from the closest focus position to the infinite focus position, it is assumed that several pulses or several dozen pulses are only necessary for driving the focusing lens group L1 (while capturing images) in a stepwise manner from the closest focus position to the infinite focus position in a contrast AF process (see FIG. 9) in the present embodiment of the digital camera for the purpose of simplifying the description, and that one step corresponds to one drive pulse and one lens-position pulse.

In addition, in the present embodiment of the digital camera, the position of the focusing lens group L1 is represented by a lens-position pulse number (variable) PN which is incremented by one every time the encoder 26 outputs one pulse (drive pulse) when the AF motor 25 is driven in the direction from the closest focus position to the infinite focus position, and the lens-position pulse number PN is 0 when the focusing lens group L1 is positioned at the initial position thereof (closest focus position in the present embodiment of the digital camera). In either of the two cases where an AF search operation in which the focusing lens group L1 is moved from the closest focus position to the infinite focus position is performed and where an AF search operation in which the focusing lens group L1 is moved from the infinite focus position to the closest focus position is performed, the lens-position pulse number at the initial position of the focusing lens group L1 is 0, the lens-position pulse numbers are added up when the focusing lens group L1 is driven stepwise from the initial position thereof to another position, and a lens-position pulse number is subtracted from the lens-position pulse numbers thus added up step by step when the focusing lens group L1 is driven stepwise in the opposite direction toward the initial position thereof.

Figure 6A:
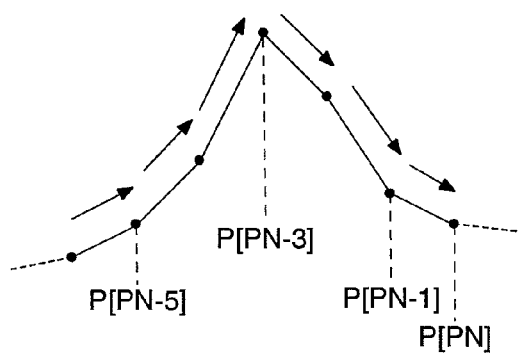
FIGS. 6A and 6B are graphs showing examples of contrast values detected as in-focus positions by the contrast AF process to illustrate the relationship between different positions of the focusing lens group and the respective contrast values thereat in the contrast AF mode.
Figure 6B:
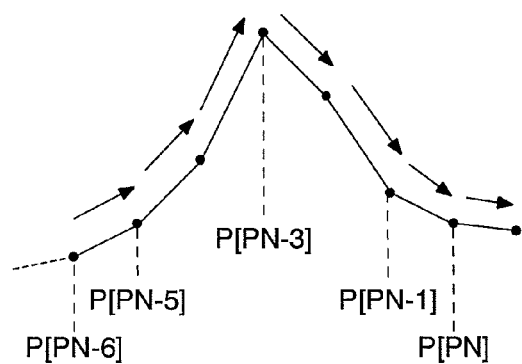
Figure 9:
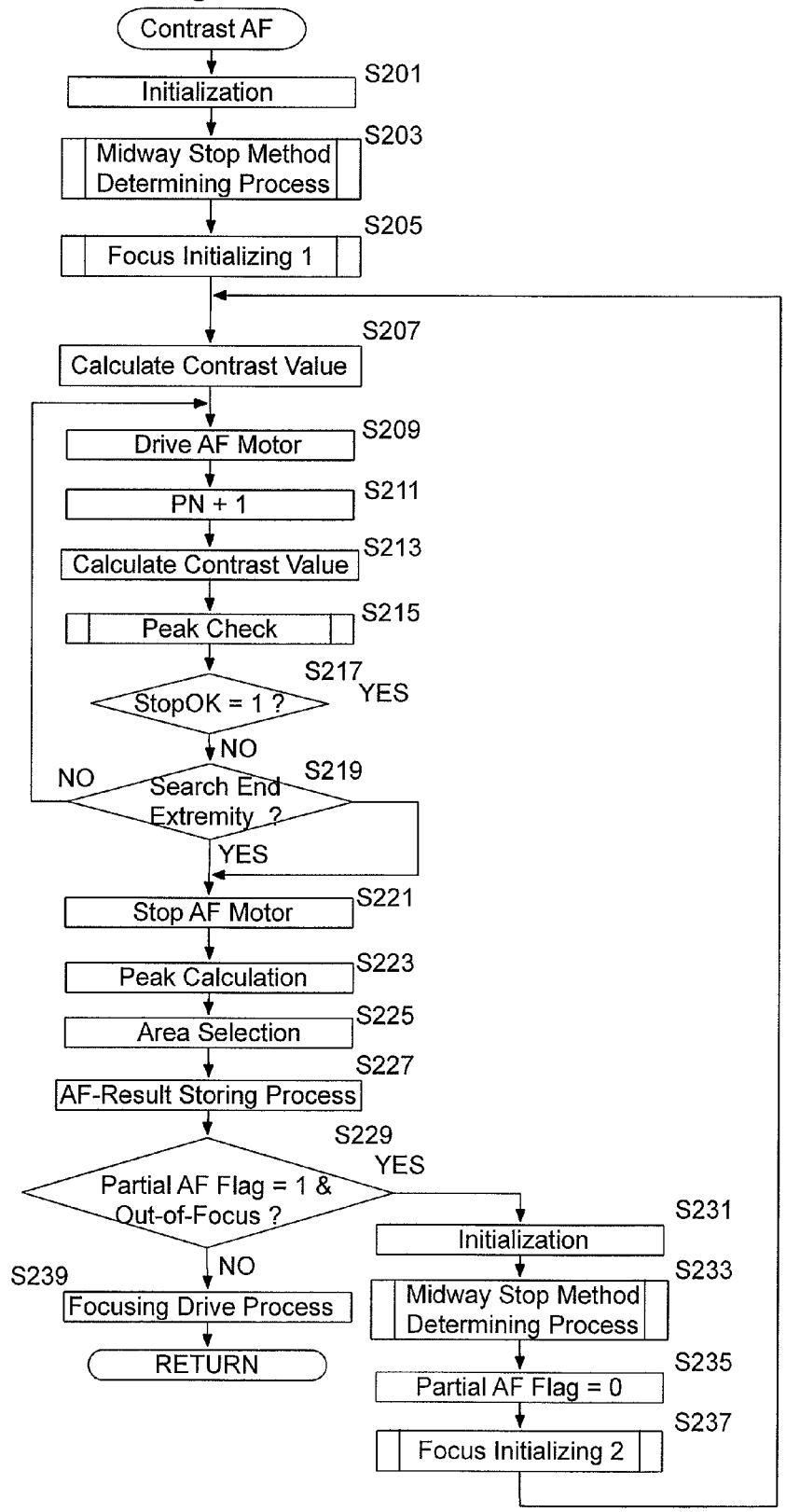
FIG. 9 is a flow chart showing a sub-routine "contrast AF process" performed in the main process shown in FIG. 8.
Figure 13:
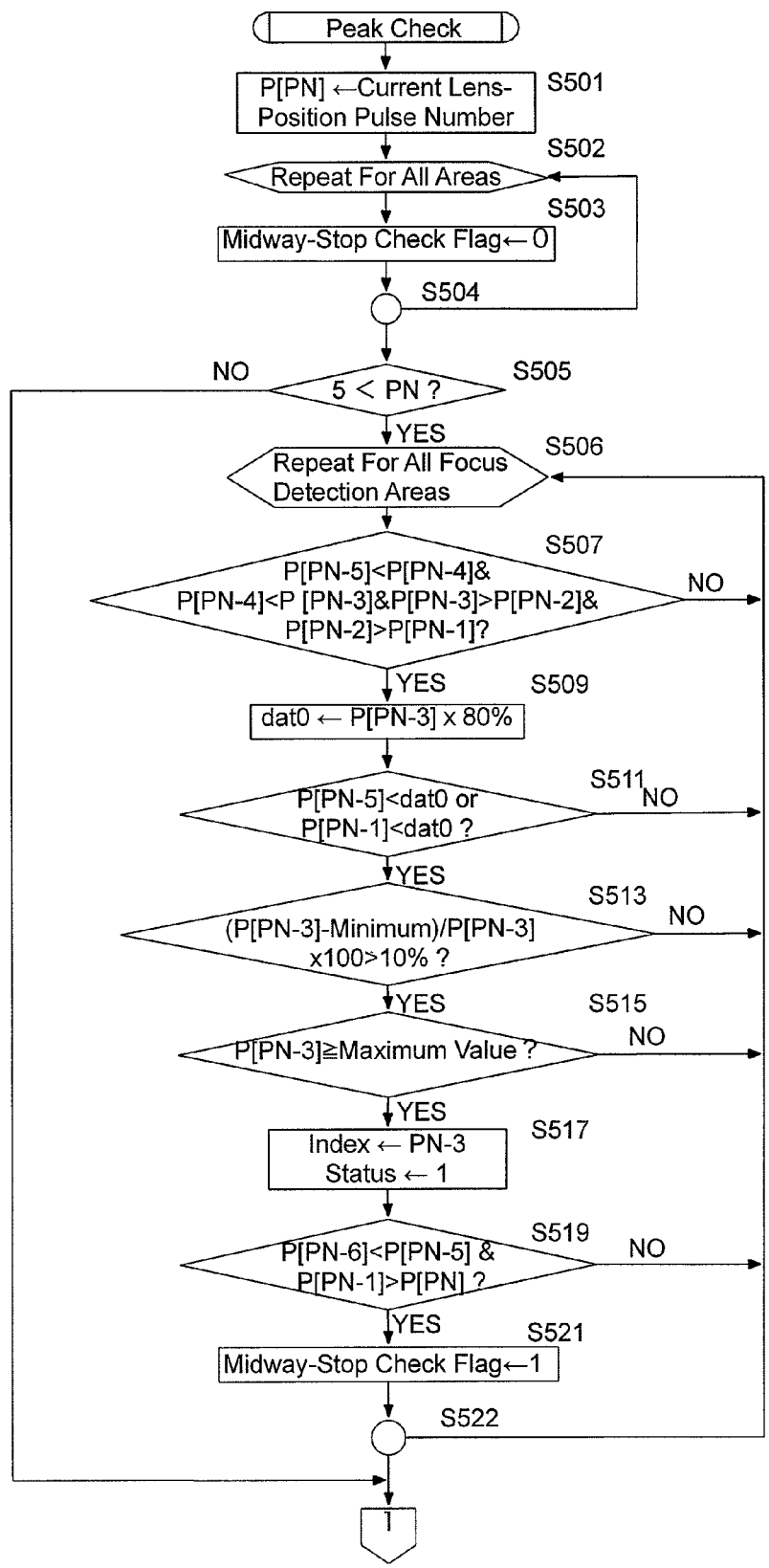
FIG. 13 is a flow chart showing the first half of a sub-routine "peak check process" performed in the contrast AF process shown in FIG. 9.
Figure 14:
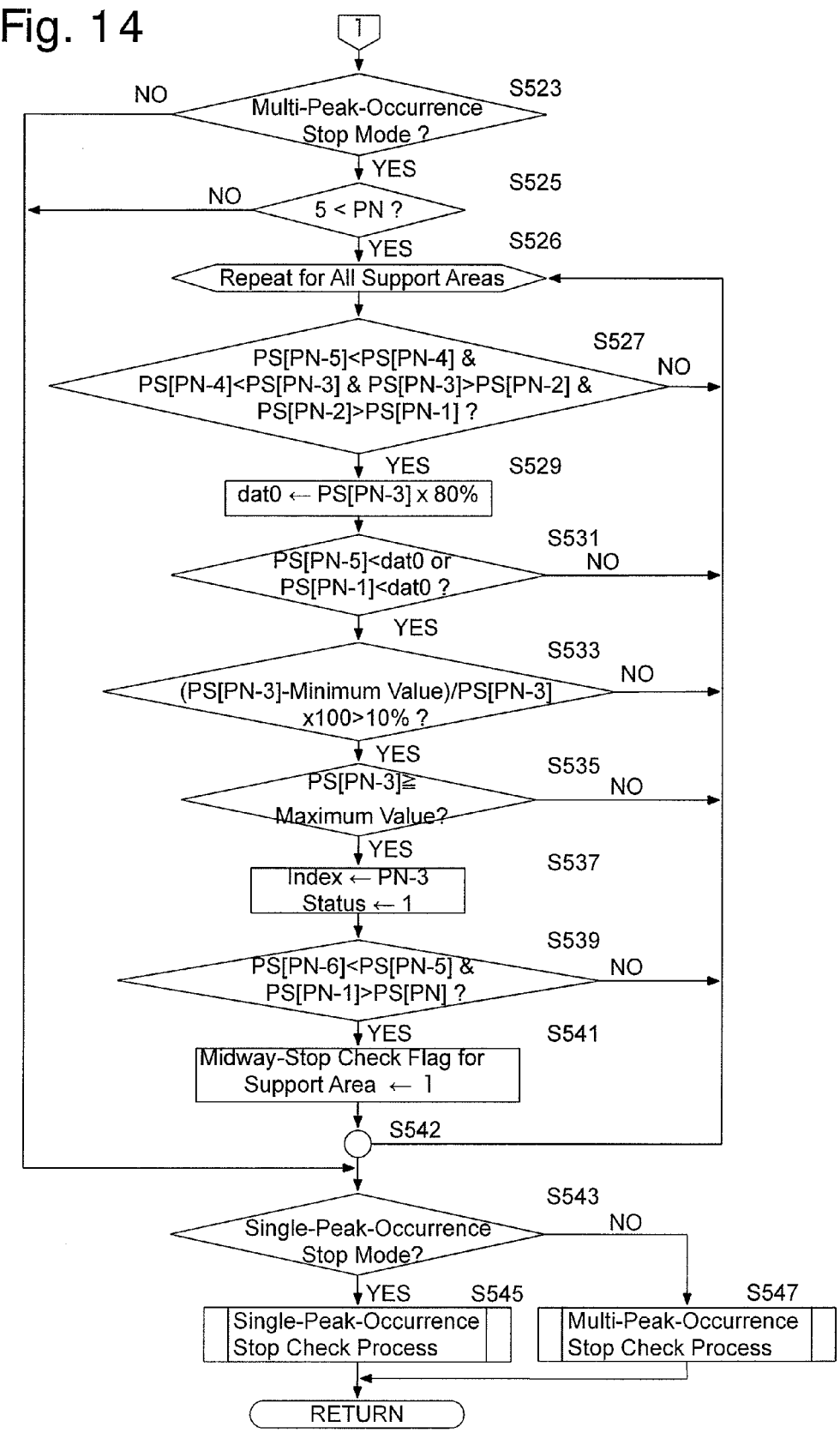
FIG. 14 is a flow chart showing the latter half of the sub-routine "peak check process" performed in the contrast AF process shown in FIG. 9.

FIGS. 6A and 6B each show a manner of a peak check process (see step S215 shown in FIG. 9, and FIGS. 13 and 14). In the present embodiment of the digital camera, based on a group of obtained contrast values P[PN] at consecutive five lens positions (five stepping positions) from the immediately preceding lens position (PN−1) to the five preceding lens position (PN−5), contrast values at two adjacent lens positions of the focusing lens group L1 are compared with each other successively to determine whether or not the contrast value increases two times consecutively, and subsequently decreases two times consecutively, i.e., whether or not the contrast value of the middle (third) lens position of the five lens positions is a peak contrast value. If the contrast value increases two times consecutively, and subsequently decreases two times consecutively, it is determined that the contrast value of the middle lens position (PN−3) of the five lens positions is a peak contrast value. The determination of the peak contrast value is made by determining whether or not the contrast value increases a first predetermined number of times "a" consecutively, and subsequently decreases a second predetermined number of times "b" consecutively. Although both "a" and "b" are set to 2 as a usual condition for the AF search operation or 3 as a condition for a midway stop of the AF search operation in the present embodiment of the digital camera, each of "a" and "b" can be set to any other number.

[Search Operation Midway Stop]

In the present embodiment of the digital camera, upon a peak contrast occurring during the AF search operation in the contrast AF process, the AF search operation is terminated under predetermined conditions to thereby make it possible to reduce the time for focus adjustment with no focusing error. The following two different processes are selectively performed according to different algorithms depending on the object brightness.

[In the Case of Bright Object]

The present embodiment of the digital camera operates in the CCD high-speed drive mode, the small pixel-count addition mode, and a single-peak-occurrence stop mode when the brightness of the object is high.

In the case of detecting a contrast when the brightness of the object is high in the small pixel-count addition mode, the exposure time of the image pickup device 11 is short and the sum of pixel additions is smaller than that in the case of detecting a contrast when the brightness of the object is low in the large pixel-count addition mode, so that there is a little possibility of contrasts outside of the selected detection area being picked up on one occasion and not picked up on another occasion. Accordingly, the AF search operation is terminated (during the progress thereof) upon a peak contrast occurring in any of the five focus detection areas MM0 through MM4 in the multi-point distance measuring mode, and the AF search operation is terminated upon a peak contrast occurring in the focus detection area SM0 in the spot distance measuring mode. Due to this operation terminating the AF search operation during the progress thereof, a further reduction in time required for focus adjustment can be achieved.

[In the Case of Dark Object]

The present embodiment of the digital camera operates in the CCD low-speed drive mode, the large pixel-count addition mode, and a multi-peak-occurrence stop mode when the brightness of the object is low.

In the case of detecting a contrast when the brightness of the object is low in the large pixel-count addition mode, the exposure time of the image pickup device 11 is long, so that it is often the case that contrasts outside of the selected detection area are picked up on one occasion and not picked up on another occasion due to hand shake (camera shake), or the like, during the AF search operation. Moreover, the number of pixel values increases due to the large pixel-count addition mode (VGA), and accordingly, it is often the case that contrasts outside of the selected detection area are picked up on one occasion and not picked up on another occasion and there is a high possibility of a false peak contrast occurring. To prevent this from occurring, in the present embodiment of the digital camera, the AF search operation is terminated immediately after a peak contrast occurs in any of the five focus detection areas MM0 through MM4 and a peak contrast occurs in either of the associated two support areas (MS0 and MS1, MS0 and MS2, MS1 and MS3, MS2 and MS4, or MS3 and MS5) at the same time in the multi-point distance measuring mode, while the AF search operation is terminated immediately after a peak contrast occurs in the focus detection area SM0 and a peak contrast occurs in either of the two support areas SS0 and SS1 at the same time in the spot distance measuring mode. The chances of a false peak contrast being detected are remote and the possibility of a focusing error occurring is low if the AF search operation is terminated at such a moment rather than terminated upon a peak contrast occurring in one of the five focus detection areas MM0 through MM4 in the multi-point distance measuring mode.

The occurrence of a peak contrast in each support area MS0 through MS5, SS0 and SS1 used in the contrast AF process can be within the range of two or three successive pulse positions. In this case, a focus detection area or areas (MM0 through MM4 and SM0) which are to be supported, the closest focus position or some midway point between the closest focus position, or the farthest focus position can be selected.

[Direction of the Search Operation]

In the case where the initial process is performed upon the power of the digital camera being turned ON or an in-focus state is not determined, an AF search operation in which the direction of the AF search operation (the direction of movement of the focusing lens group L1 in the AF search operation) is set in the following manner is performed.

Figure 4A:
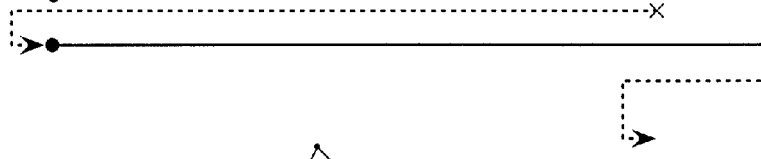
Figure 4B:
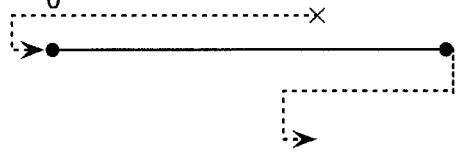
Figure 4C:
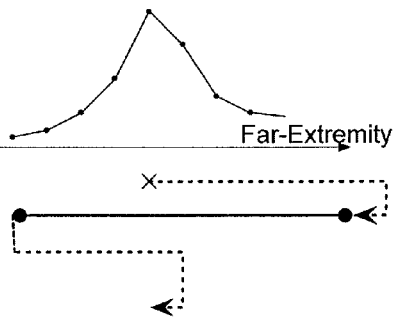
Figure 4D:
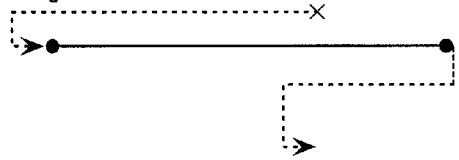

In the case where the focus detection area is wide or a plurality of focus detection areas are distributed in a wide range though one focus detection area is small, i.e., in the case of a multi-point distance measurement, the direction of the search operation is limited to the direction from the closest focus position toward the infinite focus position regardless of the current stop position of the focusing lens group L1 (see FIGS. 4A and 4B). Since it is sometimes the case that images of near and far objects are included in a plurality of focus detection areas, the near object is given priority for being brought into focus by limiting the direction of the AF search operation to the direction from the closest focus position toward the infinite focus position.

In the case where the focus detection area is small, e.g., in the case of the spot distance measurement, the direction of the AF search operation is set to either the direction from the infinite focus position toward the closest focus position (see FIG. 4C) or the direction from the closest focus position toward the infinite focus position (see FIG. 4D) depending on the current stop position of the focusing lens group L1. In the spot distance measurement, the chances of images of near and far objects being included in the focus detection area are low, and accordingly, the time for focus adjustment can be reduced by terminating the AF search operation upon a peak contrast occurring after the commencement of the AF search operation.

[Partial AF Search Operation]

According to the above described AF search operation, the time required for the first (initial) focusing operation (focusing operation performed for the first time to bring an object into focus) is reduced. However, since the AF search operation commences from either limit of movement of the focusing lens group L1 (i.e., either the closest focus position or the infinite focus position) even if a main object remains unchanged or changes a little in the case where the AF search operation is performed again after focus is achieved on the main object, the AF search operation is performed even for a searching range in which no main object exists.

Figure 5A:
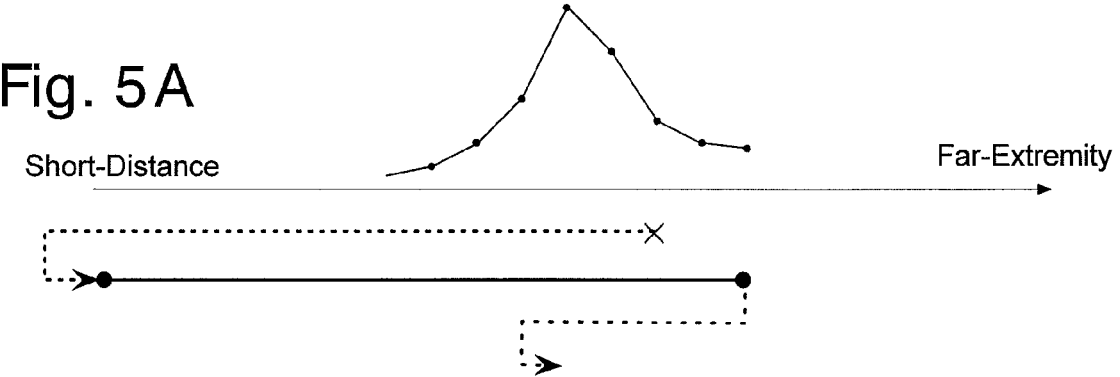
Figure 5B:
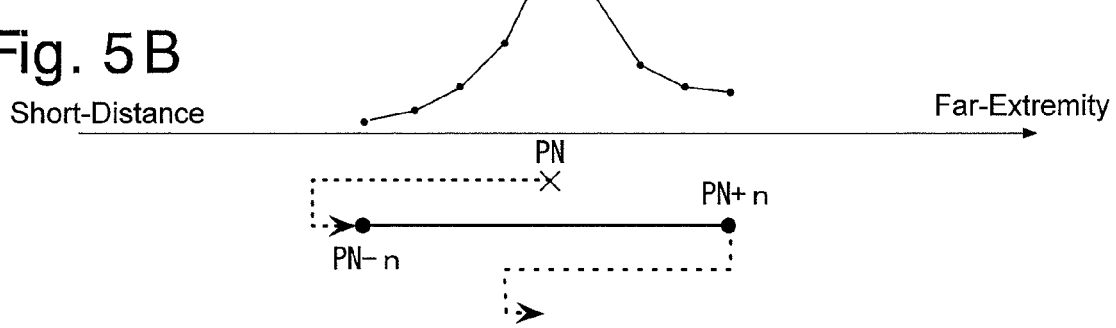

To prevent such an unnecessary AF search operation from being performed, in the prevent embodiment of the digital camera, when the AF search operation is performed again after focus is achieved on a main object, an object image (first object image) captured in the focus detection area at the time immediately after focus is achieved on the main object and an object image (second object image) captured in the same focus detection area at the time the AF search operation is performed again are compared with each other to determine the degree of pattern matching therebetween, and a partial AF search operation (partial AF operation) (see FIG. 5B) in which the AF search operation is performed over a range of movement of the focusing lens group L1 which is narrowed to a fore-and-aft range of the main object is performed if the aforementioned second object image matches the aforementioned first object image or if the degree of pattern matching between the first and second object images is greater than a predetermined value to reduce the time required for refocusing. FIG. 5A shows movements of the focusing lens group L1 in the case where the AF search operation is performed for the first time.

[Image Comparing Process]

Figures 7A, 7B, 7C, 7D, 7E:

FIGS. 7A through 7E each show an example of binarized image data (brightness data) in the focus detection area used for focusing. FIGS. 7A through 7E each show a binarized object image pattern in a 7 by 6 matrix. FIG. 7A shows a binarized object image data captured immediately after the focusing lens group L1 is moved to an in-focus position thereof by an execution of the AF search operation.

FIGS. 7B through 7E each show an embodiment of the distribution of binarized object image data (object image pattern) captured at the time the AF search operation is performed again after an in-focus state is obtained. Among the object image patterns shown in FIGS. 7B through 7E, the object image pattern shown in FIG. 7B perfectly matches the object image pattern shown in FIG. 7A; namely, the degree of pattern matching therebetween is maximum. The degree of pattern matching decreases in that order from the object image pattern shown in FIG. 7C to the object image pattern shown in FIG. 7E. In the present embodiment of the digital camera, the object image patterns shown in FIGS. 7B through 7C are within the allowable range for the partial AF search operation and the object image patterns shown in, and after FIG. 7D are out of the allowable range for the partial AF search operation; namely, the aforementioned partial AF search operation is performed if the degree of pattern matching is equal to or greater than that in the case shown in FIG. 7C. For instance, the allowable limit in the degree of pattern matching is determined so that the binarized pixel ratio of unmatched pixels to total pixels becomes equal to or smaller than 20 percent. In the particular case shown in FIGS. 7A through 7E, the allowable limit in the degree of pattern matching is determined so that the number of unmatched pixels becomes equal to or smaller than 9.

It is desirable that the aforementioned allowable range be changed according to the focal length of the photographing optical system if the photographing lens of the digital camera is a zoom lens. For instance, the allowable range is set to be a narrow range when the focal length is short, and the allowable range widens as the focal length increases.

Operations of the contrast AF process performed in the present embodiment of the digital camera will be discussed with reference to the flow charts shown in FIGS. 8 through 16.

Figure 8:
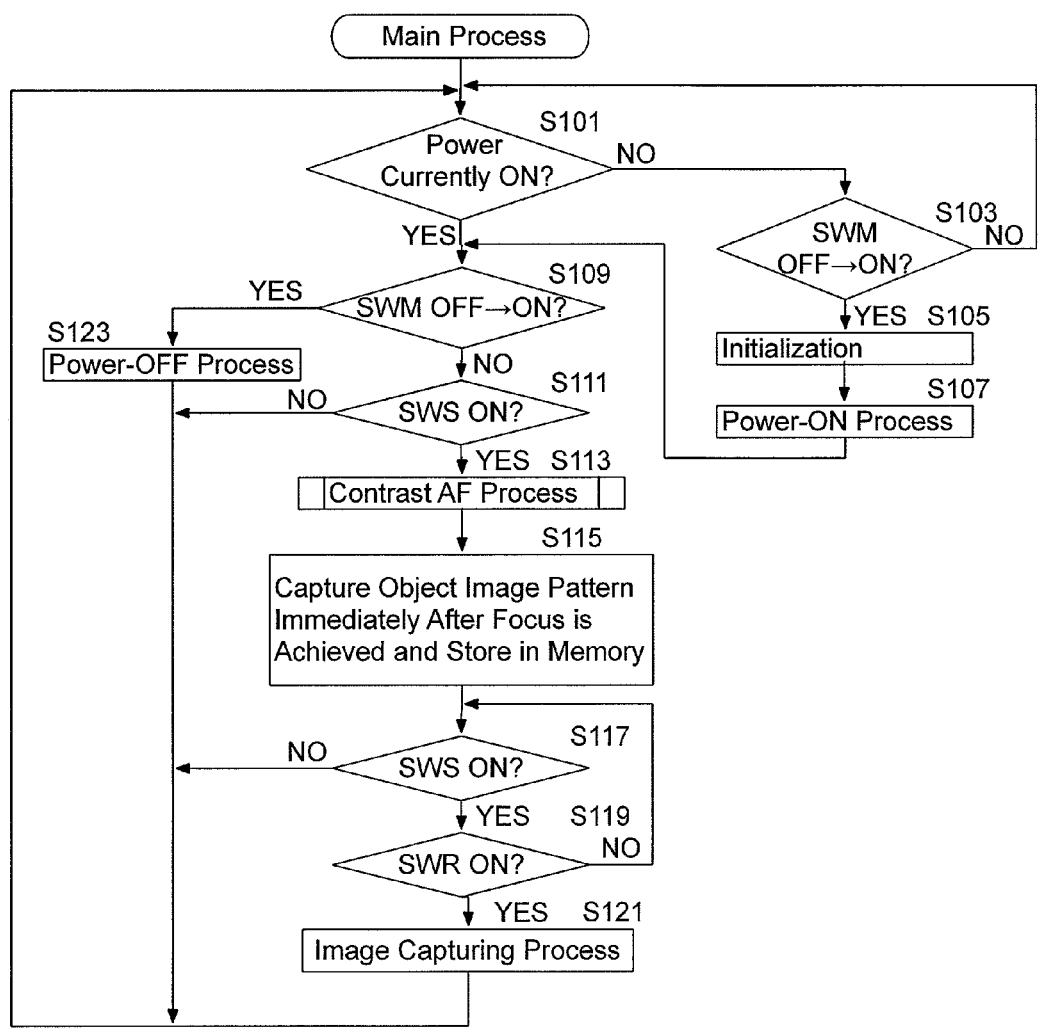
FIG. 8 is a flow chart showing an embodiment of a main process having a sequence of operating steps which is performed in the digital camera, to which the focus adjusting system according to the present invention is applied.

FIG. 8 is a flow chart showing an embodiment of a main process having a sequence of operating steps which is performed in this digital camera. Control enters this main process upon a battery (not shown) being loaded into the digital camera.

In the main process, firstly it is determined whether or not the power is currently ON (step S101). If the power is not currently ON (if NO at step S101), it is determined whether or not a main switch SWM has changed to the ON state from the OFF state (step S103). If the main switch SWM has not changed to the ON state from the OFF state (if NO at step S103), control returns to step S101. Namely, a main-switch check process consisting of the operations at steps S101 and S103 is repeated to determine whether or not the main switch SWM has changed to the ON state from the OFF state. If the main switch SWM has changed to the ON state from the OFF state (if YES at step S103), hardware/software initialization (initialization of the internal RAM 15a, ports, variables, etc.) is performed (step S105), and a power-ON process in which the power is turned ON to supply power to various parts is performed (step S107), and control proceeds to step S109.

At step S109 it is determined whether or not the main switch SWM has changed to the ON state from the OFF state. If the main switch SWM has not changed to the ON state from the OFF state (if NO at step S109), it is determined whether or not a photometering switch SWS is ON (step S111). If the photometering switch SWS is not ON (if NO at step S111), control returns to step S101. Since control returns to step S101 in a state where the power is ON, it is determined at step S101 that the power is currently ON and control proceeds to step S109. Accordingly, during the time the power remains ON, control repeats a check process including the operations at steps S101 and S109 until the main switch SWM changes to the ON state from the OFF state or the photometering switch SWS is turned ON. Upon the main switch SWM changing to the ON state from the OFF state during the aforementioned check process, a power-OFF process is performed (step S123), and control returns to the aforementioned main-switch check process, which consists of the operations at steps S101 and S103.

Upon the photometering switch SWS being turned ON (if YES at step S111), a contrast AF process (see FIG. 9) is performed to bring a target object into focus by moving the focusing lens group L1 (step S113). Subsequently, a pattern of an object image (object image pattern) which is formed in the focus detection area having been used to bring the target object into focus and which is formed in the same focus detection area immediately after an in-focus state is obtained on the target object is captured and stored in the image memory 21 (step S115). Subsequently, it is determined whether or not the photometering switch SWS is ON (step S117). If the photometering switch SWS is ON (if YES at step S117), it is determined whether or not a release switch SWR is ON (step S119). If the release switch SWR is not ON (if NO at step S119), control returns to step S117 to repeat the operations at steps S117 and S119 to determined whether or not the photometering switch SWS and the release switch SWR are ON, respectively.

Upon the release switch SWR being turned ON (if YES at step S119), an image capturing process is performed (step S121), and control returns to step S101. If the photometering switch SWS is turned OFF (if NO at step S117), control simply returns to step S101.

The contrast AF process that is performed at step S113 will be hereinafter discussed in detail with reference to the flow chat shown in FIG. 9.

In the contrast AF process, firstly various variables, etc., are initialized (step S201). For instance, in this particular embodiment, each status (flag) is cleared (i.e., set to 0), contrast values are cleared, a lens-position pulse number PN is initialized (PN=0), the maximum contrast value is set to 0, the minimum contrast value is set to FFFFFFFF, a midway-stop identification flag is cleared, a midway-stop OK flag is cleared, and the number of detection areas is set according to the focal length.

Variables and others are defined as follows. Contrast values are those actually obtained from pixels in each focus detection area or support area.

Given that the lens-position pulse number PN is 0 when the focusing lens group L1 is positioned at the closest focus position that serves as the initial position of the focusing lens group L1, the lens-position pulse number PN is a variable which is incremented by one by the CPU 15 every time the encoder 26 outputs one pulse (drive pulse) when the AF motor 25 is driven in the direction toward the infinite focus position. When the AF motor 25 is driven to move the focusing lens group L1 in the direction toward the initial position thereof, the lens-position pulse number PN is decremented by one by the CPU 15 every time the encoder 26 outputs one pulse (drive pulse).

The maximum contrast value and the minimum contrast value are variables to which actually-obtained maximum and minimum contrast values are assigned, respectively.

The midway-stop identification flag (PerhapsOK flag) is a flag for determining whether or not to identify a midway stop of the AF search operation. Specifically, the midway-stop identification flags "0" and "1" indicate that an AF search operation without and with a midway stop, respectively.

The midway-stop OK flag (StopOK flag) is a flag which enables or disables the AF search operation. Specifically, the midway-stop OK flags "0" and "1" disable and enable the AF search operation, respectively.

A midway-stop check flag (StopCheck flag) is a flag which indicates whether or not to check conditions of the midway stop of the AF search operation. Specifically, the midway-stop check flags "0" and "1" indicate not to check and to check conditions of the midway stop of the AF search operation, respectively.

A partial AF flag (PartialAF flag) is a flag for determining whether or not to perform the AF search operation partially over the range from the closest focus position to the infinite focus position. Specifically, the partial AF flags "0" and "1" indicate not to perform and to perform the AF search operation partially over the range from the closest focus position to the infinite focus position, respectively.

After the completion of the above described initializing process at step S201, a midway stop method determining process is performed (step S203). Namely, it is determined whether the AF search operation is terminated upon at least two peak contrasts occurring simultaneously in at least two areas (one focus detection area and at least one associated support area), respectively, or the AF search operation is terminated upon a peak contrast occurring in any of the five focus detection areas.

A condition for determining the way to stop the AF search operation can be either the object brightness or a CCD drive mode of the image pickup device (CCD image sensor) 11 that operates in association with the object brightness.

Subsequently, a first focus initializing process (see FIG. 11) is performed (step S205). In the first focus initializing process, a partial AF check process (see FIG. 12) is performed to capture an object image pattern and the object image pattern in the internal RAM 15a, and whether or not to perform the partial AF search operation is set. When the partial AF search operation is not performed in the case of, e.g., the first contrast AF process (the first AF search operation), the partial AF flag is set to "0" and a process for moving the focusing lens group L1 to an initial position thereof determined according to the current focus position (lens position) of the focusing lens group L1 and the current focus area is performed.

In this process in the present embodiment of the digital camera, the focusing lens group L1 is moved to one of the limits of movement thereof (closest focus position or infinite focus position) which is closer to the current position of the focusing lens group L1 in the case of the spot distance measurement, or the focusing lens group L1 is moved to the closest focus position regardless of the current position of the photographing lens group L1 in the multi-point distance measurement. In the case where predetermined conditions are satisfied in the contrast AF process performed a second time or more, the partial AF flag is set to "1", the focusing lens group L1 is moved to an initial position thereof for the partial AF check process (i.e., the position away from the current stop position of the focusing lens group toward the closest focus position by an amount of movement corresponding to the number of pulses n), and the infinite focus position is set at a position away from the current stop position of the focusing lens group L1 toward the infinite focus position by an amount of movement corresponding to the number of pulses n, as a search end extremity at which the AF search operation is terminated. The number of pulses n is set to be equal to or greater than x (n=>x) in the case where the determination of the peak contrast value is made by determining whether or not the contrast value increases a first predetermined number of times x consecutively, and subsequently decreases a second predetermined number of times x consecutively. The number of pulses n is normally set to the number of times x plus 1 (n=x+1). Namely, the range of movement of the focusing lens group L1 for the partial AF search operation is determined to include at least a range of movement of the focusing lens group L1 in which at least the current position of the focusing lens group L1 can be determined as an in-focus position.

Subsequently, image data at the initial position of the focusing lens group L1 in the AF search operation is captured, and thereupon a contrast value calculating process is performed (step S207). Namely, based on the image data input from the image pickup device 11, the contrast value P[0] at the initial position of the focusing lens group L1 is calculated, and the maximum contrast value Max and the minimum contrast value Min are updated. Subsequently, the AF motor 25 is driven by one step in the direction to move the focusing lens group L1 toward the infinite focus position (step S209), and the lens-position pulse number PN is increased by one (step S211).

Subsequently, a contrast value P[PN] is calculated in accordance with image data input from the image pickup device 11, and the maximum contrast value and the minimum contrast value are updated (step S213).

Subsequently, a peak check process (see FIG. 13) is performed which determines whether or not the contrast value P[PN] calculated at step S213 is a peak contrast value which satisfies preset conditions (step S215). The contrast value calculating process at step S213 and the peak check process at step S215 are performed on all the focus detection areas selected at step S201.

Subsequently, it is determined whether or not the midway-stop OK flag is "1" (step S217). If the midway-stop OK flag is not "1" (if NO at step S217), it is determined whether or not the focusing lens group L1 has reached the search end extremity thereof (step S219). If the focusing lens group L1 has not reached the search end extremity thereof (if NO at step S219), control returns to step S209, so that the operations at steps S209 through S219 are repeated while the focusing lens group L1 is moved stepwise toward the search end extremity.

If the midway-stop OK flag is "1" (if YES at step S217) or if the focusing lens group L1 has reached the search end extremity thereof (if YES at step S219), the AF motor 25 is stopped (step S221). Subsequently, a peak calculation process for calculating a peak contrast value (by linear approximation) is performed in accordance with the five contrast values at consecutive five lens positions which are obtained in the loop process at steps S209 through S219 (step S223). Namely, an estimated more-precise peak contrast value and the position thereof are calculated by linear approximation because there is a possibility of a real peak contrast value existing in the vicinity of a peak contrast value among the contrast values respectively calculated at the stepping positions.

Subsequently, an area selection process is performed at step S225. In the area selection process, one of the focus detection areas in which a value at the closest distance is obtained in accordance with the peak contrast value obtained at each focus detection area is selected as an in-focus area in the multi-point distance measuring mode. Subsequently, an AF-result storing process, upon an AF result (in-focus or out-of-focus) being obtained, is performed in which the CCD drive mode and the exposure time is stored (step S227). Thereafter, it is determined whether or not the partial AF flag is "1" and the focus state is an out-of-focus state (step S229). If the partial AF flag is not "1" or the focus state is not an out-of-focus state (if NO at step S229; i.e., if the partial AF flag is "1" and the focus state is an in-focus state, or if the partial AF flag is not "1" regardless of the focus state), a focusing drive process in which the focusing lens group L1 is moved to the lens position thereof, at which a peak contrast value is obtained in the aforementioned selected in-focus area regardless of whether the focus state is an in-focus state or an out-of-focus state, is performed (step S239). Thereafter, control returns to the main process.

If the partial AF flag is "1" and the focus state is an out-of-focus state (if YES at step S229), an initialization process similar to the initialization process performed at step S201 is performed (step S231), a midway stop method determining process similar to the midway stop method determining process performed at step S203 is performed (step S233), the partial AF flag is set to "0" (step S235), a second focus initializing process (see FIG. 11) is performed (step S237), and control returns to step S207. The second focus initializing process is identical to the first focus initializing process except that the partial AF check process that is performed at step S301 in the first focus initializing process is not performed in the second focus initializing process.

Namely, if the focus state is an out-of-focus state as a result of performing the partial AF search operation, a normal contrast AF process is performed.

The operations at steps S321 through S325 correspond to the partial AF search operation, and the operations at steps S305 through S319 correspond to the normal contrast AF search operation.

[Determination of Midway Stop Method]

Figure 10:
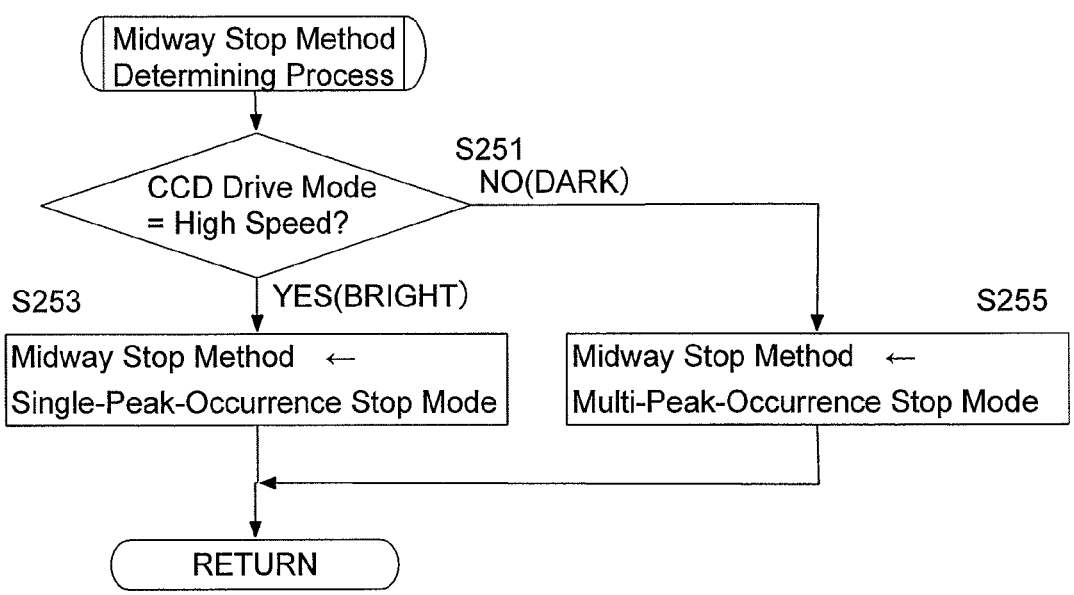
FIG. 10 is a flow chart showing a sub-routine "midway stop method determining process" performed in the contrast AF process shown in FIG. 9.

The midway stop method determining process that is performed at steps S203 and S235 will be hereinafter discussed in detail with reference to the flow chart shown in FIG. 10.

In the midway stop method determining process, it is determined whether or not the CCD drive mode is the CCD high-speed drive mode (step S251). The image pickup device 11 operates in the CCD high-speed drive mode (short-time exposure mode) when object brightness is equal to or higher than a predetermined value, or operates in the CCD low-speed drive mode (long-time exposure mode) when object brightness is lower than the predetermined value.

In the case of the CCD high-speed drive mode (if YES at step S251), i.e., in the case of a bright object, the single-peak-occurrence stop mode is set (at step S253) and control returns. In the case of the CCD low-speed drive mode (if NO at step S251), i.e., in the case of a dark object, the multi-peak-occurrence stop mode is set (at step S255) and control returns.

In the single-peak-occurrence stop mode, the AF search operation is terminated upon a peak contrast occurring in any of the five focus detection areas MM0 through MM4 in the case of the multi-point distance measuring mode, or the AF search operation is terminated upon a peak contrast occurring in the focus detection area SM0 in the case of the spot distance measuring mode. In the multi-peak-occurrence stop mode, the AF search operation is terminated immediately after a peak contrast occurs in any of the five focus detection areas MM0 through MM4, and a peak contrast occurs in either of the associated two support areas (MS0 and MS1, MS0 and MS2, MS1 and MS3, MS2 and MS4, or MS3 and MS5) at the same time in the case of the multi-point distance measuring mode, or the AF search operation is terminated immediately after a peak contrast occurs in the focus detection area SM0 and a peak contrast occurs in either of the two support areas SS0 and SS1 at the same time in the case of the spot distance measuring mode.

[First Initializing Process and Second Focus Initializing Process]

Figure 11:
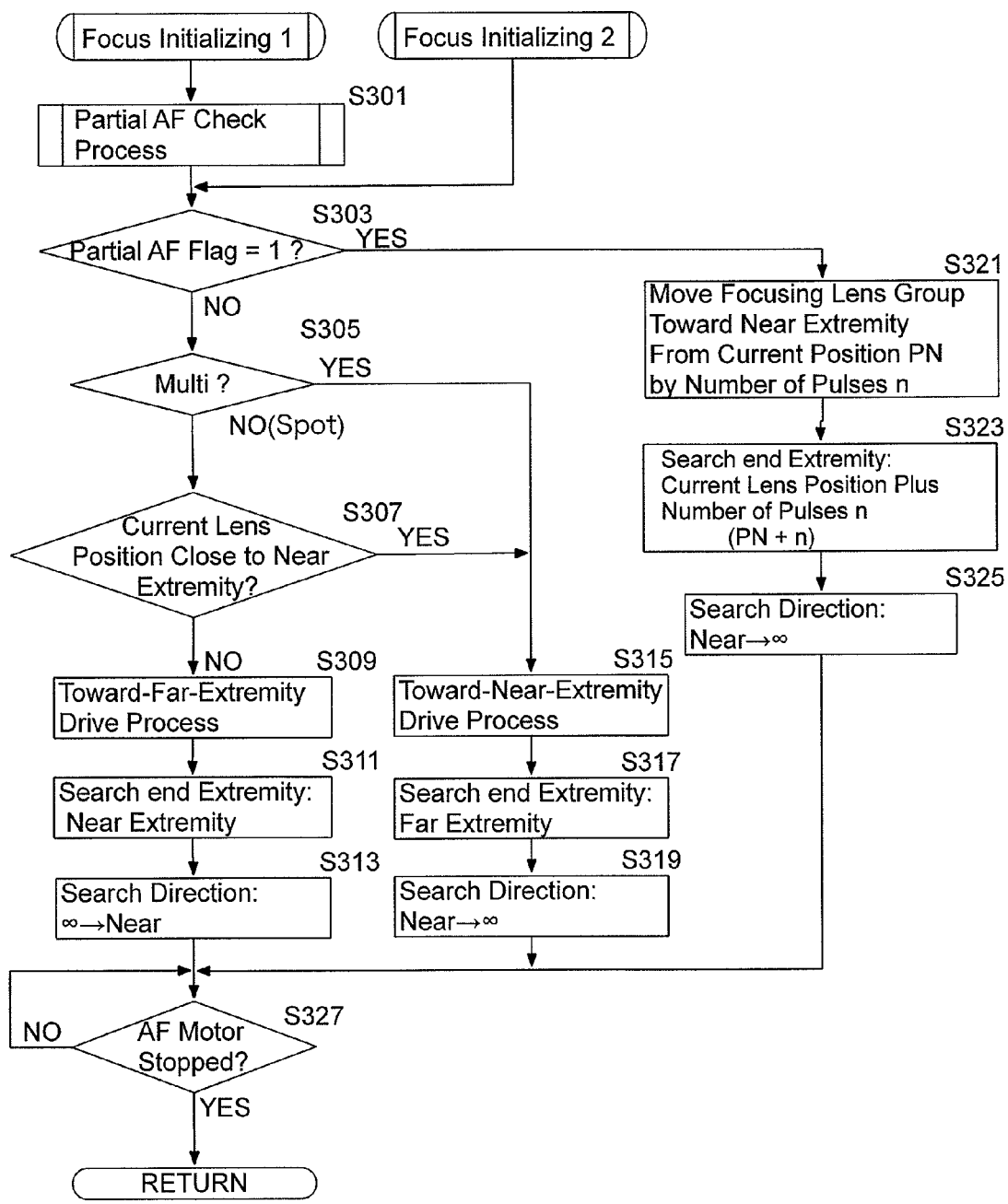
FIG. 11 is a flow chart showing a sub-routine "first focus initializing process" and a sub-routine "second focus initializing process" each of which is performed in the contrast AF process shown in FIG. 9.

The first focus initializing process and the second focus initializing process that are respectively performed at step S205 and S237 in the contrast AF process will be discussed in detail with reference to the flow chart shown in FIG. 11. The difference between the first and second focus initializing processes is in that the partial AF check process that is performed at step S301 in the first focus initializing process is not performed in the second focus initializing process.

In the first focus initializing process, firstly the partial AF check process (see FIG. 12) is performed (step S301). The partial AF flag is set to "1" in the partial AF check process if predetermined conditions are satisfied.

Subsequently, it is determined whether or not the partial AF flag is "1" (step S303). If the partial AF flag is "1" (if YES at step S303), a lens drive process in which the focusing lens group L1 is moved toward the closest focus position from the current position thereof (PN) by an amount of movement corresponding to the number of pulses n is performed (step S321), the lens position which corresponds to the current lens position of the focusing lens group L1 plus the amount of movement corresponding to the number of pulses n is set as the search end extremity of the focusing lens group L1 (step S323), the direction of the AF search operation is set to the direction from the closest focus position toward the infinite focus position (step S325), and control proceeds to step S327. At step S327, it is determined whether or not the AF motor 25 has been driven to move the focusing lens group L1 toward the closest focus position by the amount of movement corresponding to the number of pulses n and thereupon the AF motor 25 has been stopped. Upon the AF motor 25 being stopped (if YES at step S327), control returns.

The AF-motor driving operation performed in the operation at step S321, in which the AF motor 25 is driven to move the focusing lens group L1, is controlled by an interrupt process (not shown). The position of the focusing lens group L1 upon the completion of the operation at step S321 becomes, e.g., the same as the lens position represented by the lens-position pulse number (PN-n) in the case of the embodiment shown in FIG. 5B. Thereafter, in the partial AF search operation, the AF search operation is performed in the direction toward the infinite focus position from this lens position of the lens-position pulse number (PN-n) as a search start extremity until the lens position of the lens-position pulse number (PN+n).

If the partial AF flag is not "1" (if NO at step S303), the operations at steps S305 through S319 are performed. More specifically, firstly it is determined whether or not the currently-set distance measuring mode is the multi-point distance measuring mode (step S305). If the currently-set distance measuring mode is the multi-point distance measuring mode (if YES at step S305), a toward-near-extremity drive process is performed (step S315). In the toward-near-extremity drive process, the AF motor 25 is driven in the direction toward the infinite focus position to move the focusing lens group L1 to the closest focus position (near extremity). Subsequently, the infinite focus position is set as the search end extremity of the focusing lens group L1 (step S317), the direction of the AF search operation is set to the direction from the closest focus position toward the infinite focus position (step S319), and control proceeds to step S327.

If the currently-set distance measuring mode is not the multi-point distance measuring mode (if NO at step S305), i.e., if the currently-set distance measuring mode is in the spot AF measuring mode, it is determined whether or not the current position of the focusing lens group L1 is in the vicinity of the closest focus position (step S307). If the current position of the focusing lens group L1 is in the vicinity of the closest focus position (if YES at step S307), the toward-near-extremity drive process is performed (step S315), the infinite focus position is set as the search end extremity of the focusing lens group L1 (step S317), the direction of the AF search operation is set to the direction from the closest focus position toward the infinite focus position (step S319), and control proceeds to step S327. If the current position of the focusing lens group L1 is not in the vicinity of the closest focus position (if NO at step S307), a toward-far-extremity drive process is performed (step S309). In the toward-far-extremity drive process, the AF motor 25 is driven in the direction toward the infinite focus position to move the focusing lens group L1 to the infinite focus position (far extremity). Subsequently, the closest focus position is set as the search end extremity of the focusing lens group L1 (step S311), the direction of the AF search operation is set to the direction from the infinite focus position toward the closest focus position (step S313), and control proceeds to step S327.

The operations at step S309 and S315 is controlled by an interrupt process (not shown). Thereafter, if the focusing lens group L1 has reached the closest focus position or the infinite focus position and thereupon the AF motor 25 is stopped (if YES at step S327), control returns.

With the above described first and second focus initializing processes, the focusing lens group L1 is moved from the current position thereof toward the closest focus position by an amount of movement corresponding to the number of pulses n when the partial AF search operation is performed. When the partial AF search operation is not performed, the focusing lens group L1 is moved to the closest focus position regardless of the current position of the focusing lens group L1 in the multi-point distance measuring mode, or moved to the closest focus position and the infinite focus position when the current position of the focusing lens group L1 is in the vicinity of the closest focus position and the infinite focus position, respectively, in the spot distance measuring mode. Thereafter, the position of the focusing lens group L1 after it has been thus moved is designated as the initial position (search start extremity) of the focusing lens group L1, and the AF search operation in which the focusing lens group L1 is moved toward the set search end extremity is performed.

[Partial AF Check Process]

Figure 12:
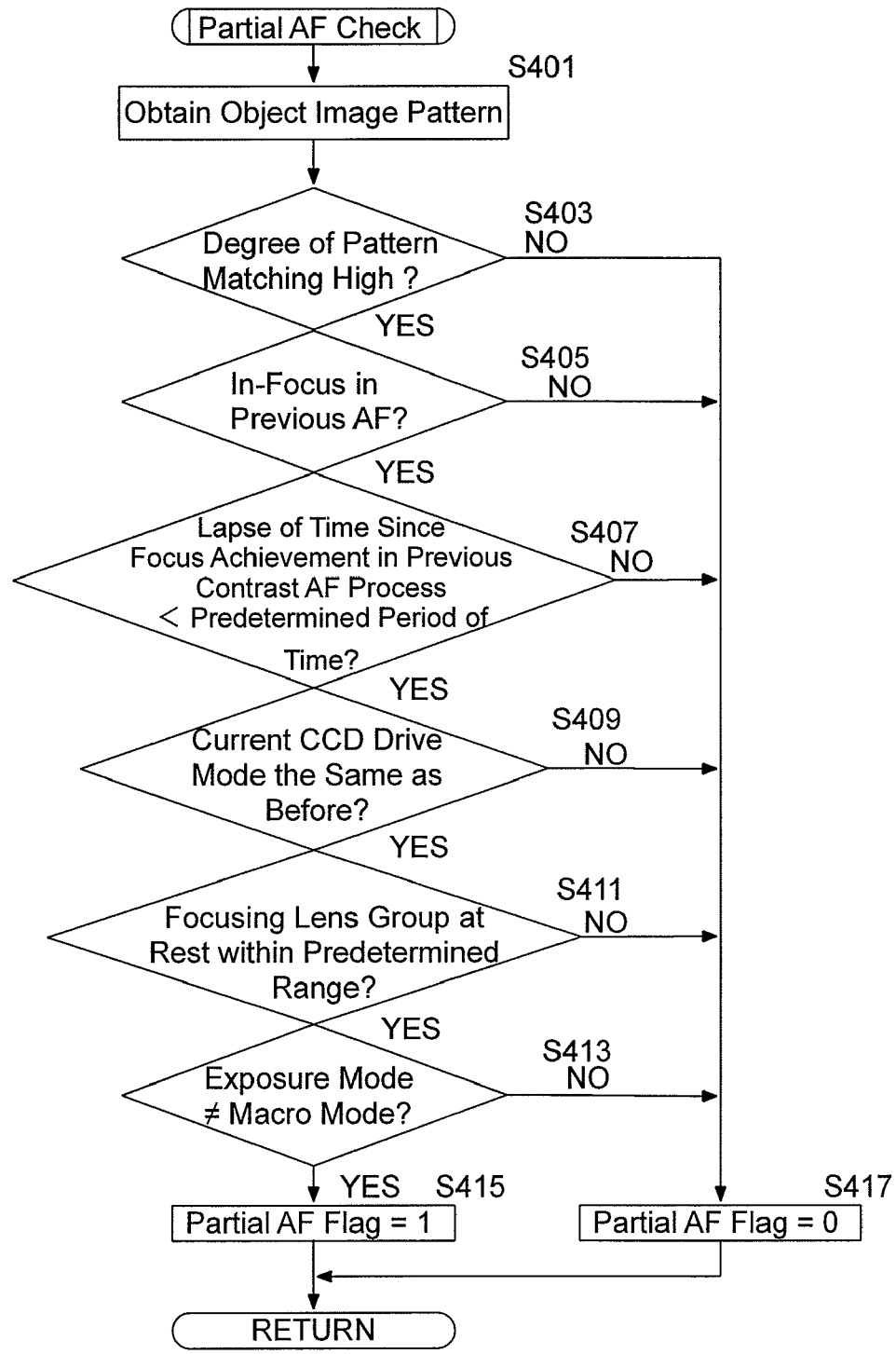
FIG. 12 is a flow chart showing a sub-routine "partial AF check process" performed in the contrast AF process shown in FIG. 11.

The partial AF check process that is performed at step S301 will be hereinafter discussed in detail with reference to the flow chart shown in FIG. 12. In the partial AF check process, firstly image data in the selected focus detection area (focus detection area in which a focused object image is included) which is captured by the image pickup device 11 is input and binarized to obtain object image pattern (step S401). In this embodiment of the digital camera, an object image pattern such as one of the object image patterns shown in FIGS. 7A through 7E is obtained.

Subsequently, the stored object image pattern at the time focus is achieved is compared with the current object image to determine whether or not the degree of pattern matching therebetween is high (step S403). If the degree of pattern matching thus determined is low, or if no object image pattern at the time focus is achieved is stored (if NO at step S403), the partial AF flag is set to "0" (step S417) and control returns.

If it is determined at step S403 that the degree of pattern matching is high (if YES at step S403), it is determined whether or not an in-focus state has been obtained in the previous contrast AF process (step S405). If an in-focus state has not been obtained in the previous contrast AF process (if NO at step S405), the partial AF flag is set to "0" (step S417) and control returns.

If an in-focus state has been obtained in the previous contrast AF process (if YES at step S405), it is determined whether or not a lapse of time since the moment an in-focus state is obtained in the previous contrast AF process is smaller than a predetermined period of time (step S407). If this lapse of time is not smaller than the predetermined period of time (if NO at step S407), the partial AF flag is set to "0" (step S417) and control returns. This is because composition and the target object often change after a lapse of a predetermined period of time. It is appropriate that this predetermined period of time be approximately two to three seconds.

If the lapse of time since the moment an in-focus state is obtained in the previous contrast AF process is smaller than the predetermined period of time (if YES at step S407), it is determined whether or not the current CCD drive mode (CCD high-speed drive mode or CCD low-speed drive mode) is the same as the previous CCD drive mode (step S409). If the current CCD drive mode is not the same as the previous CCD drive mode (if NO at step S409), the partial AF flag is set to "0" (step S417) and control returns. This is because a large change in the object brightness causes the CCD drive mode to change, and because it is often the case that composition and the target object change due to such a large change in the object brightness. It is possible for the CCD drive mode checking operation at step S409 to be replaced by an operation which determines whether or not the change in object brightness is smaller than a predetermined value.

If the current CCD drive mode is the same as the previous CCD drive mode (if YES at step S409), it is determined whether or not the focusing lens group L1 is currently at rest within a predetermined range of movement thereof (step S411).

In the present embodiment of the digital camera, the partial AF search operation is not performed when the focusing lens group L1 is at rest on the closest focus side since a large reduction in time required for the AF search operation cannot be expected because the AF search operation starts from the closest focus side in either of the two distance measuring modes (multi-point distance measuring mode and spot distance measuring mode). In this case, the aforementioned predetermined range of movement of the focusing lens group L1 is predetermined to be, e.g., one third of the entire range of movement of the focusing lens group L1 on the closest focus side.

When the focusing lens group L1 is stopped at the infinite focus position, the partial AF search operation is not performed if focus is achieved on an object at a far distance because there is a possibility of an object on the closest focus side not being given priority of the AF search operation if the partial AF search operation is performed when an object impossible to be sidestepped by the result of the degree of pattern matching enters the closest focus side. In this case, the aforementioned predetermined range of movement of the focusing lens group L1 is predetermined to be, e.g., one third of the entire range of movement of the focusing lens group L1 on the infinite focus side.

Accordingly, in the present embodiment of the digital camera, it is determined whether or not the focusing lens group L1 is currently at rest within one third of the entire range of movement of the focusing lens group L1 in the center of the entire range of movement thereof. If the focusing lens group L1 is not currently at rest within this predetermined range (if NO at step S411), the partial AF flag is set to "0" (step S417) and control returns.

If the focusing lens group L1 is currently at rest within this predetermined range (if YES at step S411), it is determined whether the currently-selected exposure mode is not macro mode (close-up mode) (step S413). If the currently-selected exposure mode is macro mode (if NO at step S413), the partial AF flag is set to "0" (step S417) and control returns. This is because the target object and composition change largely by even a slight relative movement between the camera body and the object in macro mode.

If the currently-selected exposure mode is not macro mode (if YES at step S413), the partial AF flag is set to "1" (step S415) and control returns.

In the case where all the conditions at steps S403 through S413 are satisfied, the partial AF flag is set to "1" (step S415), control returns, and it is determined at step S303 that the partial AF flag is "1". Thereupon, the partial AF search operation (the operations at steps S321 through S325) is performed. If at least one of the conditions at steps S403 and S413 is not satisfied, the partial AF flag is set to "0" (step S417), control returns, and it is determined at step S303 that the partial AF flag is not "1", and accordingly, the normal contrast AF search operation (the operations at steps S305 through S319) is performed.

In addition, in the present embodiment of the digital camera, the condition that the gyro sensor 31 has not detected either tilting movement or panning movement can be included in the conditions for performing the partial AF search operation. This is because it is conceivable that composition will change and that the target object will also change when the camera is tilted or panned.

In addition, although the range of movement of the focusing lens group L1 for the partial AF search operation is set to the range from the lens position of the lens-position pulse number (PN−n) to the lens position of the lens-position pulse number (PN+n) regardless of the degree of image matching in the present embodiment of the digital camera, the absolute value of n (|n|) can be a large value even within the range of conditions for the degree of image matching. In either case, the absolute value of n is determined so that the range of movement of the focusing lens group L1 for the partial AF search operation is a range allowing the current position and fore-and-aft positions of the focusing lens group L1 to be determined to lie within the depth of focus in the case where the positions of the focusing lens group L1 lie within the depth of focus.

In addition, the partial AF search operation can be made to be performed if some of the above described conditions including the conditions at steps S403 through S413 are satisfied.

Furthermore, in the present embodiment of the digital camera, in the case where the degree of pattern matching is maximum (e.g., when the object image pattern shown in FIG. 7B perfectly matches the object image pattern shown in FIG. 7A), it is possible that the AF search operation not be performed because it is conceivable that neither the target object nor composition has changed.

[Peak Check Process]

The peak check process that is performed at step S217 will be hereinafter discussed in detail with reference to the flow chart shown in FIGS. 13 and 14. The peak check process is for determining a peak contrast value in each focus detection area from the contrast value P[PN] on each lens-position pulse number PN which is obtained while moving the focusing lens group L1 stepwise. In the present embodiment of the digital camera, based on a group of obtained contrast values P[PN] at consecutive five lens positions (five stepping positions), contrast values at two adjacent lens positions of the focusing lens group L1 are compared with each other successively in the direction from the search start extremity (initial position) toward the search end extremity of the focusing lens group L1, to determine whether or not the contrast value increases two times (first predetermined number of times) consecutively, and subsequently decreases two times (second predetermined number of times) consecutively, i.e., whether or not the contrast value of the middle (third) lens position of the five lens positions is a peak contrast value. Thereafter, in the case where the contrast value increases two times consecutively, and subsequently decreases two times consecutively, the maximum contrast value P[PN] at that time is determined to be a peak contrast (maximum value).

In the peak check process, firstly the current lens-position pulse number PN is assigned as a lens-position pulse number PN (step S501).

Subsequently, the midway-stop check flags set for each focus detection area and the associated support areas are all initialized (set to 0) (steps S502, S503 and S504).

Subsequently, it is determined whether or not the lens-position pulse number PN is greater than 5 (step S505). Namely, it is determined whether or not at least five consecutive positions necessary for calculating five peak contrast values at consecutive five lens positions are within a range in which contrast values can be obtained. If the lens-position pulse number PN is not greater than 5 (if NO at step S505), control proceeds to step S523 shown in FIG. 14. If the lens-position pulse number PN is greater than 5 (if YES at step S505), the operations at steps S507 through S521 are repeated for each of all the focus detection areas MM0 through MM4 and SM0 (step S506 through step S522).

It is determined whether or not the contrast value increases two times consecutively, and subsequently decreases two times consecutively based on a group of obtained five contrast values at consecutive five lens positions from the immediately preceding lens position (PN−1) to the five preceding lens position (PN−5) (step S507). Otherwise (if NO at step S507), control returns to step S506 so that the operation at step S507 is performed for the subsequent focus detection area.

If the contrast value increases two times consecutively, and subsequently decreases two times consecutively (if YES at step S507; see FIG. 6A), 80 percent of the contrast value (P[PN−3]) of the lens position (PN−3) that becomes a maximum value among the group of obtained five contrast values is assigned to a lower limit value dat0 (step S509). Subsequently, it is determined whether or not a first condition for reliability is satisfied, i.e., whether or not either the contrast value P[PN−5] at the lens position (PN−5), which is one of the opposite end positions of the five lens positions, or the contrast value P[PN−1] at the lens position (PN−1), which is the other of the opposite end positions of the five lens positions, is smaller than the lower limit value dat0 (step S511). Namely, it is determined whether or not the difference between the peak contrast value and each contrast value at the opposite end positions of the five lens positions is sufficiently large. If neither of the contrast value P[PN−5] at the lens position (PN−5) and the contrast value P[PN−1] at the lens position (PN−1) is smaller than the lower limit value dat0 (if NO at step S511), control returns to step S506 so that the operations at steps S507 through S511 are performed for the subsequent focus detection area. This is because it is assumed that the reliability of the peak contrast value is low since the contrast variation is small.

If either the contrast value P[PN−5] at the lens position (PN−5) or the contrast value P[PN−1] at the lens position (PN−1) is smaller than the lower limit value dat0 (if YES at step S511), it is determined whether or not a second condition for reliability is satisfied, i.e., whether or not the difference between the peak contrast value P[PN−3] and the minimum contrast value among all the contrast values obtained by the previous processes performed thus far is greater than 10 percent of the peak contrast value P[PN−3] (step S513). Otherwise (if NO at step S513), control returns to step S506 so that the operations at steps S507 through S513 are performed for the subsequent focus detection area. This is because it is assumed that the reliability of the peak contrast value is low since the peak contrast value is small.

If the difference between the peak contrast value P[PN−3] and the minimum contrast value among all the contrast values obtained by the previous processes performed thus far is greater than 10 percent of the peak contrast value P[PN−3] (if YES at step S513), it is determined whether or not a third condition for reliability is satisfied, i.e., whether or not the peak contrast value P[PN−3] is equal to or greater than the maximum contrast value (step S515).

If the peak contrast value P[PN−3] is not equal to or greater than the maximum contrast value (if NO at step S515), control returns to step S506 so that the operations at steps S507 through S515 are performed for the subsequent focus detection area. If the peak contrast value P[PN−3] is equal to or greater than the maximum contrast value (if YES at step S515), the lens-position pulse number (PN−3) at which the peak contrast value P[PN−3] has been obtained is assigned to a position index INDEX while a peak existence flag STATUS is set to "1" (step S517), and control proceeds to step S519.

It should be noted that the position index INDEX is a variable to which a lens-position pulse number for stopping the focus lens group L1 at a lens position thereof as an in-focus position is assigned, and that the focusing lens group L1 is moved to the position of the lens-position pulse number represented by the set position index INDEX after the AF search operation is terminated. The peak existence flag STATUS is a flag for distinguishing whether or not a peak contrast value has been obtained.

At step S519 it is determined whether or not the contrast values P[PN−5] and P[PN−1], that are obtained at the opposite end positions of consecutive five lens positions at which a group of five contrast values are respectively obtained by the peak check process, are greater than the contrast values P[PN−6] and P[PN], respectively, that are obtained at lens positions immediately after and before the aforementioned opposite end positions at which the contrast values P[PN−5] and P[PN−1] are obtained, respectively. Namely, it is determined whether or not the peak contrast value P[PN−3] is a peak contrast value obtained in the case where the contrast value increases three times consecutively, and subsequently decreases three times consecutively (see FIG. 6B). If the peak contrast value P[PN−3] is such a peak contrast value (if YES at step S519), the midway-stop check flag is set to "1" (step S521) and control proceeds to step S523. If the peak contrast value P[PN−3] is not such a peak contrast value (if NO at step S519), control returns to step S506 so that the operations at steps S507 through S519 are performed for the subsequent focus detection area. Since strict conditions are set up in the case of terminating the AF search operation during the progress thereof, the possibility of an error focusing occurring is low.

Upon the operations at steps S506 through S521 being performed on all the focus detection areas MM0 through MM4 or the focus detection area SM0, control proceeds to step S523 from step S522. It is determined at step S523 whether or not the digital camera is currently in the multi-peak-occurrence stop mode. If the digital camera is not currently in the multi-peak-occurrence stop mode (if NO at step S523), control proceeds to step S543. If the digital camera is currently in the multi-peak-occurrence stop mode (if YES at step S523), control proceeds to step S525. The process from step S525 to S542 is substantially the same as the process from step S505 to step S522, and performed on all the support areas MS0 through MS5 or the support areas SS0 and SS1.

It is determined at step S525 whether or not the lens-position pulse number PN is greater than 5. Namely, it is determined whether or not at least five consecutive positions necessary for calculating five peak contrast values at consecutive five lens positions are within a range in which contrast values can be obtained. If the lens-position pulse number PN is not greater than 5 (if NO at step S525), control proceeds to step S543. If the lens-position pulse number PN is greater than 5 (if YES at step S525), the operations at steps S527 through S541 are repeated for each support area (step S526 through step S542).

It is determined whether or not the contrast value increases two times consecutively, and subsequently decreases two times consecutively based on a group of obtained five contrast values at consecutive five lens positions from the immediately preceding lens position (PN−1) to the five preceding lens position (PN−5) (step S527). Otherwise (if NO at step S527), control returns to step S526 so that the operation at step S527 is performed for the subsequent support area, or proceeds to step S543 in the case of the last support area (steps S526 through S542, and step S543).

If the contrast value increases two times consecutively, and subsequently decreases two times consecutively (if YES at step S527), 80 percent of the contrast value (P[PN−3]) of the lens position (PN−3) that becomes a maximum value among the group of obtained five contrast values is assigned to the lower limit value dat0 (step S529). Subsequently, it is determined whether or not a first condition for reliability is satisfied, i.e., whether or not either the contrast value P[PN−5] at the lens position (PN−5), which is one of the opposite end positions of the five lens positions, or the contrast value P[PN−1] at the lens position (PN−1), which is the other of the opposite end positions of the five lens positions, is smaller than the lower limit value dat0 (step S531). Namely, it is determined whether or not the difference between the peak contrast value and each contrast value at the opposite end positions of the five lens positions is sufficiently large. If neither of the contrast value P[PN−5] at the lens position (PN−5) and the contrast value P[PN−1] at the lens position (PN−1) is smaller than the lower limit value dat0 (if NO at step S531), control returns to step S526 so that the operations at steps S527 through S531 are performed for the subsequent support area. This is because it is assumed that the reliability of the peak contrast value is low since the contrast variation is small.

If either the contrast value P[PN−5] at the lens position (PN−5) or the contrast value P[PN−1] at the lens position (PN−1) is smaller than the lower limit value dat0 (if YES at step S531), it is determined whether or not a second condition for reliability is satisfied, i.e., whether or not the difference between the peak contrast value P[PN−3] and the minimum contrast value among all the contrast values obtained by the previous processes performed thus far is greater than 10 percent of the peak contrast value P[PN−3] (step S533). Otherwise (if NO at step S533), control returns to step S526 so that the operations at steps S527 through S533 are performed for the subsequent support area. This is because it is assumed that the reliability of the peak contrast value is low since the peak contrast value is small.

If the difference between the peak contrast value P[PN−3] and the minimum contrast value among all the contrast values obtained by the previous processes performed thus far is greater than 10 percent of the peak contrast value P[PN−3] (if YES at step S533), it is determined whether or not a third condition for reliability is satisfied, i.e., whether or not the peak contrast value P[PN3] is equal to or greater than the maximum contrast value (step S535). If the peak contrast value P[PN3] is not equal to or greater than the maximum contrast value (if NO at step S535), control returns to step S526 so that the operations at steps S527 through S535 are performed for the subsequent support area. If the peak contrast value P[PN3] is equal to or greater than the maximum contrast value (if YES at step S535), the lens-position pulse number (PN−3) at which the peak contrast value P[PN−3] has been obtained is assigned to the position index INDEX while the peak existence flag STATUS is set to "1" (step S537), and control proceeds to step S539.

At step S539 it is determined whether or not the contrast values P[PN−5] and P[PN−1], that are obtained at the opposite end positions of consecutive five lens positions at which a group of five contrast values are respectively obtained by the peak check process, are greater than the contrast values P[PN−6] and P[PN], respectively, that are obtained at lens positions immediately after and before the aforementioned opposite end positions at which the contrast values P[PN−5] and P[PN−1] are obtained, respectively. Namely, it is determined whether or not the peak contrast value P[PN−3] is a peak contrast value obtained in the case where the contrast value increases three times consecutively, and subsequently decreases three times consecutively. If the peak contrast value P[PN−3] is such a peak contrast value (if YES at step S539), the midway-stop check flag for support area is set to "1" (step S541) and control proceeds to step S543. If the peak contrast value P[PN−3] is not such a peak contrast value (if NO at step S539), control returns to step S526 so that the operations at steps S527 through S539 are performed for the subsequent support area. Since strict conditions are set up in the case of terminating the AF search operation during the progress thereof, the possibility of an error focusing occurring is low.

At step S543 it is determined whether or not the digital camera is currently in the single-peak-occurrence stop mode. If the digital camera is currently in the single-peak-occurrence stop mode (if YES at step S543), a single-peak-occurrence stop check process (see FIG. 15) is performed (S545), and control returns. If the digital camera is not currently in the single-peak-occurrence stop mode (if NO at step S543), a multi-peak-occurrence stop check process (see FIG. 16) is performed (S547), and control returns.

[Single-Peak-Occurrence Stop Check Process]

Figure 15:
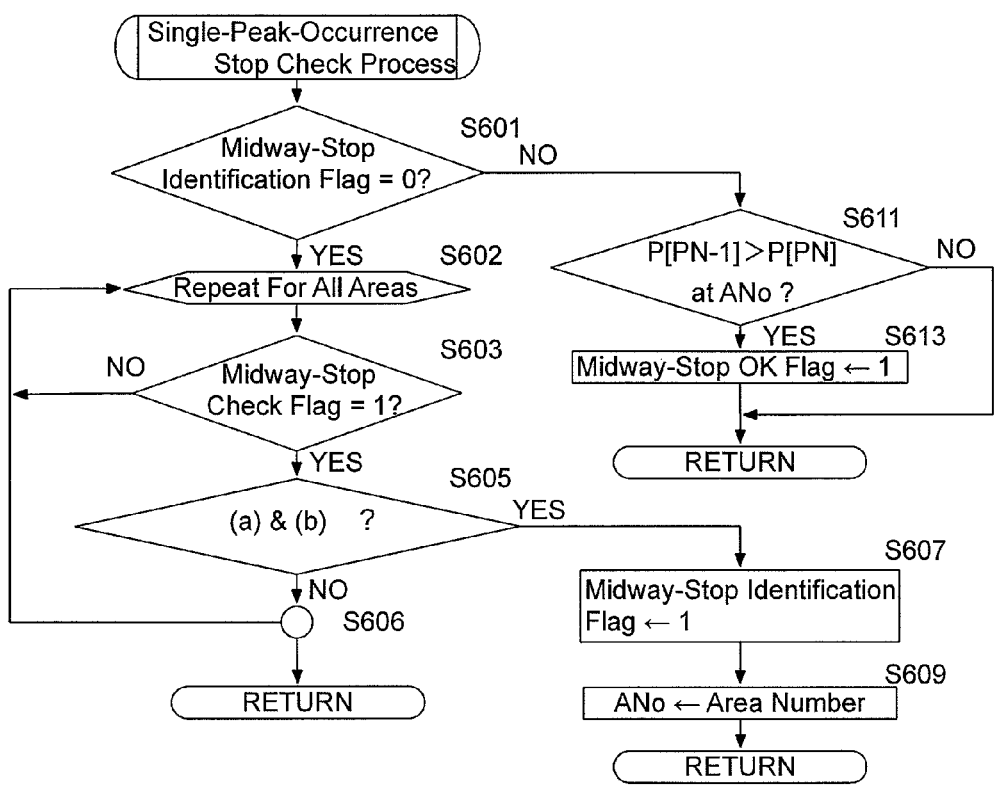
FIG. 15 is a flow chart showing a sub-routine "single-peak-occurrence stop check process" performed in the peak check process shown in FIG. 14.

The single-peak-occurrence stop check process that is performed at step S545 will be hereinafter discussed in detail with reference to the flow chart shown in FIG. 15. In this process, firstly it is determined whether or not the midway-stop identification flag is "0" (step S601). The midway-stop identification flag is "0" when control first enters the single-peak-occurrence stop check process, so that control proceeds to a loop process at steps S602 through S606.

In the loop process at steps S602 through S606, it is determined whether or not the midway-stop check flag is "1" for each area (step S603). The area for which the midway-stop check flag is set to "1" is the area on which it is determined that the peak contrast value P[PN−3] is a peak contrast value obtained in the case where the contrast value increases three times consecutively, and subsequently decreases three times consecutively, and for which the midway-stop check flag is set to "1" at step S541. If it is determined at step S603 that the midway-stop check flag is not "1" (if NO at step S603), control returns to step S602 and it is determined whether or not the midway-stop check flag is "1" for the subsequent area (step S603).

If it is determined at step S603 that the midway-stop check flag is "1" (if YES at step S603), it is determined whether or not both the following two conditions (a) and (b) are satisfied (step S605):

(a) No peak contrast exists in the vicinity of the closest focus position (near extremity) of the focusing lens group L1 in any other focus detection area, and (b) A peak contrast exists within plus or minus 1 pulse position even if existing in any other focus detection area.

If both the conditions (a) and (b) are not both satisfied (if NO at step S605), control returns to step S602 so that the operations at steps S603 and S605 are performed for the subsequent area. If all the areas do not satisfy both the two conditions (a) and (b), control returns. If any area satisfies both of the two conditions (a) and (b) (if YES at step S605), the midway-stop identification flag is set to "1" (step S607), the area number of this area is assigned to an area number ANo (step S609), and control returns. Thereafter, the focus detected area represented by the area number ANo is selected as an in-focus area in the area selection process at step S225 (see FIG. 9).

If the midway-stop identification flag is "1" (if NO at step S601), it is determined whether or not the contrast value P[PN] at the current position of the focusing lens group L1 is smaller than the contrast value P[PN−1] at the immediately preceding position of the focusing lens group L1 (step S611). If the contrast value P[PN] is smaller than the contrast value P[PN−1] (if YES at step S611), the midway-stop OK flag is set to "1" (step S613), and control returns. If the contrast value P[PN] is not smaller than the contrast value P[PN−1] (if NO at step S611), control simply returns. It is determined at step S601 that the midway-stop identification flag is "1" when a position of the focusing lens group L1 at which a peak contrast is obtained has been detected and control enters the single-peak-occurrence stop check process for the second time or more, after the midway-stop identification flag is set to "1" at step S607. It is determined at step S611 that the contrast value P[PN] is smaller than the contrast value P[PN−1] when the contrast value decreases four times consecutively from a peak contrast (see FIG. 6B).

[Multi-Peak-Occurrence Stop Check Process]

Figure 16:
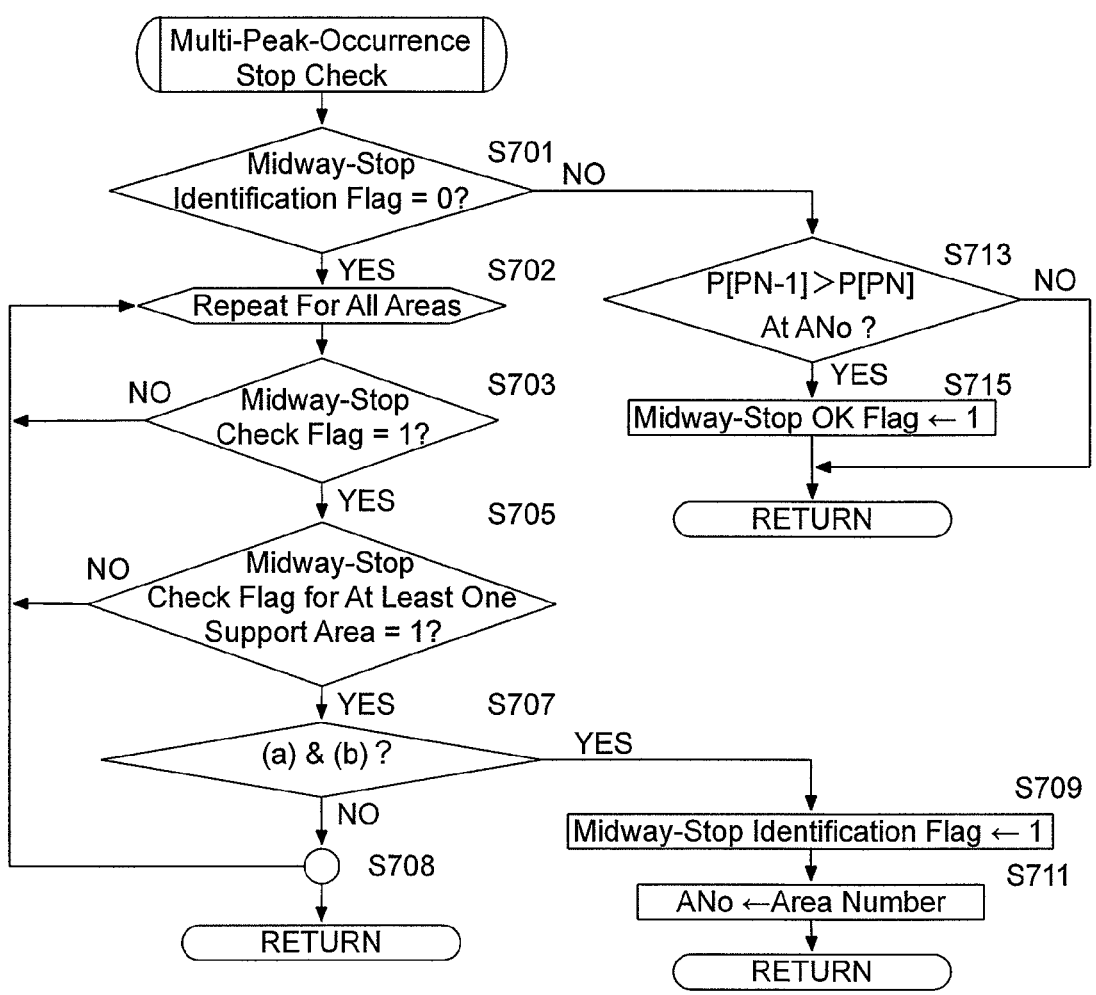
FIG. 16 is a flow chart showing a sub-routine "multi-peak-occurrence stop check process" performed in the peak check process shown in FIG. 14.

The multi-peak-occurrence stop check process that is performed at step S547 will be hereinafter discussed in detail with reference to the flow chart shown in FIG. 16.

In this process, firstly it is determined whether or not the midway-stop identification flag is "0" (step S701). The midway-stop identification flag is "0" when control first enters the multi-peak-occurrence stop check process, so that control proceeds to a loop process at steps S702 through S708.

In the loop process at steps S702 through S708, it is determined whether or not the midway-stop check flag is "1" for each area in the order thereof (step S703). The area for which the midway-stop check flag is set to "1" is the area on which it is determined that the peak contrast value P[PN−3] is a peak contrast value obtained in the case where the contrast value increases three times consecutively, and subsequently decreases three times consecutively, and for which the midway-stop check flag is set to "1" at step S541. If it is determined at step S703 that the midway-stop check flag is not "1" (if NO at step S703), control returns to step S702 and it is determined whether or not the midway-stop check flag is "1" for the subsequent area (step S703).

If it is determined at step S703 that the midway-stop check flag is "1" (if YES at step S703), it is determined whether or not the midway-stop check flag is "1" for at least one of the two support areas of the currently-checked focus detection area (step S705). If the midway-stop check flag is not "1" for either of the two support areas of the currently-checked focus detection area (if NO at step S705), control returns to step S702 so that the operations at steps S703 and S705 are performed for the subsequent focus detection area.

If it is determined at step S705 that the midway-stop check flag is "1" for at least one of the two support areas of the currently-checked focus detection area (if YES at step S705), it is determined whether or not the above described two conditions (a) and (b) are satisfied (step S707).

If both the conditions (a) and (b) are not satisfied (if NO at step S707), control returns to step S702 so that the operations at steps S703 through S707 are performed for the subsequent focus detection area. If none of the focus detection areas satisfy both the two conditions (a) and (b), control returns.

If both the two conditions (a) and (b) are satisfied (if YES at step S707), the midway-stop identification flag is set to "1" (step S709), the area number of this focus detection area is assigned to the area number ANo (step S711), and control returns. Thereafter, the focus detected area represented by the area number ANo is selected as an in-focus area in the area selection process at step S225.

If the midway-stop identification flag is "1" (if NO at step S701), it is determined whether or not the contrast value P[PN] at the current position of the focusing lens group L1 is smaller than the contrast value P[PN−1] at the immediately preceding position of the focusing lens group L1 (step S713). If the contrast value P[PN] is smaller than the contrast value P[PN−1] (if YES at step S713), the midway-stop OK flag is set to "1" (step S715), and control returns. If the contrast value P[PN] is not smaller than the contrast value P[PN−1] (if NO at step S713), control simply returns. It is determined at step S701 that the midway-stop identification flag is "1" when a position of the focusing lens group at which a peak contrast is obtained has been detected and control enters the multi-peak-occurrence stop check process for the second time or more, after the midway-stop identification flag is set to "1" at step S709. It is determined at step S713 that the contrast value P[PN] is smaller than the contrast value P[PN−1] when the contrast value decreases four times consecutively from a peak contrast (see FIG. 6B).

If the midway-stop OK flag is set to "1" by the single-peak-occurrence stop check process or the multi-peak-occurrence stop check process, control returns to the contrast AF process shown in FIG. 9, goes from step S217 to step S221, and control ends via steps S223 through S229 and S239 in order to complete the AF search operation.

As can be understood from the foregoing, according to the present embodiment of the digital camera, the time required for bringing an object into focus again after focus is achieved on the object since the partial AF search operation is performed under predetermined conditions upon focus being achieved on the object.

Moreover, in the case where the partial AF search operation is not performed in the multi-point distance measuring mode, the AF search operation is performed so that the focusing lens group L1 is moved from the closest focus position toward the infinite focus position regardless of the current position of the focusing lens group L1, which makes it possible for an object at the shortest distance to be detected and brought into focus with reliability. Furthermore, in the case where the partial AF search operation is not performed in the spot distance measuring mode, the AF search operation is performed so that the focusing lens group L1 is firstly moved to one of the closest focus position and the infinite focus position when the current position of the focusing lens group L1 is in the vicinity of one of the closest focus position and the infinite focus position, respectively, and subsequently moved toward the other of the closest focus position and the infinite focus position, which makes it possible to achieve a reduction in time required for detecting an object at the shortest distance.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera with a photographing optical system including a focusing lens group movable for focusing, said camera comprising:

a focus adjusting system which captures images at different focal positions of said focusing lens group via an image pickup device while moving said focusing lens group within a controllable searching range to detect an in-focus position of said focusing lens group based on contrasts of said captured images, and moves said focusing lens group to said in-focus position;

a memory which stores a first image captured via said image pickup device when an in-focus state is achieved upon said focusing lens group being moved to said in-focus position; and a comparing device which compares said first image that is stored in said memory with a second image which is captured via said image pickup device before commencement of movement of said focusing lens group when said focus adjusting system is subsequently actuated, wherein said focus adjusting system operates with said controllable searching range narrowed to a limited searching range including a current position of said focusing lens group when predetermined conditions are satisfied, said predetermined conditions including a condition upon which it is determined that the first image and the second image match each other one of completely and by a predetermined degree.

2. The camera according to claim 1, wherein said limited searching range is one of equal to and wider than a minimum range in which said current position of said focusing lens group can be determined to be an in-focus position thereof based on said contrasts of said images that said focus adjusting systems captures while moving said focusing lens group within said limited searching range.

3. The camera according to claim 1, wherein said images captured by said focus adjusting system to be used to detect said in-focus position of said focusing lens group are those included in at least one predetermined focus detection area.

4. The camera according to claim 1, wherein said focus adjusting system moves said focusing lens group stepwise from a near extremity side toward a far extremity when moving said focusing lens group in said limited searching range.

5. The camera according to claim 1, wherein said predetermined conditions include a condition upon which a lapse of time since a moment an in-focus state is last achieved is smaller than a predetermined period of time.

6. The camera according to claim 1, wherein said image pickup device operates in different operational modes when an object brightness is one of equal to and greater than a predetermined brightness value and when said object brightness is smaller than said predetermined value, respectively, and
wherein said predetermined conditions include a condition upon which said image pickup device operates in a same operational mode in both a latest image capturing operation and a second latest image capturing operation that is performed upon an in-focus state being last achieved.

7. The camera according to claim 1, wherein said predetermined conditions include a condition upon which a difference between a latest object brightness and a second latest object brightness that is obtained upon an in-focus state being last achieved is one of equal to or smaller than a predetermined value.

8. The camera according to claim 1, wherein said predetermined conditions include a condition upon which a position of said focusing lens group at which said focusing lens group is stopped when an in-focus state is last achieved is within a predetermined range in an entire range of movement of said focusing lens group that corresponds to a maximum of said controllable searching range.

9. The camera according to claim 8, wherein said predetermined range corresponds to approximately one third of said entire range of movement of said focusing lens group in a center portion of said entire range of movement thereof.

10. The camera according to claim 1, wherein said predetermined conditions include a condition upon which a currently-selected exposure mode is an exposure mode other than a macro mode.

11. The camera according to claim 1, wherein said camera comprises a vibration sensor for detecting vibrations caused by hand shake, tilting and panning movements of a camera body, and
wherein said predetermined conditions include a condition upon which said vibration sensor does not detect any of said hand shake, said tilting and panning movements.

12. The camera according to claim 1, wherein said focus adjusting system narrows said controllable searching range by a larger amount as said degree of image matching increases.

13. The camera according to claim 1, wherein each of said first image and said second image, which are compared with each other by said comparing device, comprises an object image pattern produced by binarizing an image of said object within a focus detection area in units of pixels.

14. The camera according to claim 1, wherein said focus adjusting system repeats a process of capturing said images at said different positions via said image pickup device while moving said focusing lens group stepwise to obtain said contrasts of said captured images, determines a position of said focusing lens group at which a peak contrast is obtained to be an in-focus position of said focusing lens group if said peak contrast exists among a group of contrasts at immediately preceding consecutive lens positions of said focusing lens group, and moves said focusing lens group to said in-focus position.

15. The camera according to claim 14, wherein said different positions are included in said controllable searching range.

16. The camera according to claim 1, wherein said focus adjusting system comprises a stepping motor which moves said focusing lens group stepwise.

17. The camera according to claim 16, wherein, while moving said focusing lens group stepwise by said stepping motor, said focusing adjusting system captures an image of said object each time said focusing lens group is moved by one step, and detects a peak contrast among a plurality of contrasts of said captured object images to determine said in-focus position.

18. The camera according to claim 1, wherein when said focus state is an out-of-focus state as a result of performing said limited searching range operation, said focus adjusting system performs a normal contrast AF process.

* * * * *